United States Patent
Fouda et al.

(10) Patent No.: US 11,112,520 B2
(45) Date of Patent: Sep. 7, 2021

(54) ENHANCEMENT OF DYNAMIC RANGE OF ELECTRODE MEASUREMENTS

(71) Applicant: Halliburton Energy Services, Inc., Houston, TX (US)

(72) Inventors: Ahmed E. Fouda, Spring, TX (US); Burkay Donderici, Houston, TX (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 161 days.

(21) Appl. No.: 16/466,140

(22) PCT Filed: Feb. 22, 2017

(86) PCT No.: PCT/US2017/018959
§ 371 (c)(1),
(2) Date: Jun. 3, 2019

(87) PCT Pub. No.: WO2018/156125
PCT Pub. Date: Aug. 30, 2018

(65) Prior Publication Data
US 2020/0073004 A1   Mar. 5, 2020

(51) Int. Cl.
*G01V 3/38* (2006.01)
*G01V 9/02* (2006.01)
(Continued)

(52) U.S. Cl.
CPC .................. *G01V 3/02* (2013.01); *G01V 3/20* (2013.01); *G01V 3/38* (2013.01); *G01V 9/02* (2013.01)

(58) Field of Classification Search
CPC ... G01V 3/02; G01V 3/04; G01V 3/06; G01V 3/20; G01V 3/22; G01V 3/24; G01V 3/38; G01V 9/02; G01V 8/16; G01V 8/24
See application file for complete search history.

(56) References Cited

U.S. PATENT DOCUMENTS

| 7,900,699 B2* | 3/2011 | Ramos | E21B 47/09 166/250.01 |
| 2005/0134279 A1* | 6/2005 | Hu | G01V 3/20 324/367 |

(Continued)

FOREIGN PATENT DOCUMENTS

| WO | WO 2014/109816 A1 | 7/2014 |
| WO | WO 2015/130298 A1 | 9/2015 |

(Continued)

OTHER PUBLICATIONS

International Search Report and the Written Opinion of the International Search Authority, dated Nov. 22, 2017, PCT/US2017/018959, 10 pages, ISA/KR.

*Primary Examiner* — David M Schindler
(74) *Attorney, Agent, or Firm* — Haynes and Boone, LLP

(57) ABSTRACT

Various embodiments include apparatus and methods implemented to monitor detection of a flood front of a waterflood in a formation. Embodiments can include control of current in a set of three current electrodes to inject current into a formation around a pipe in a wellbore, where the three current electrodes include two of the electrodes to inject current and the third electrode to operatively provide a current return. Response of the formation to the current injections can be communicated by interrogating an optical fiber that extends along a longitudinal axis of the pipe. Determination of progression of the waterflood with respect to the wellbore can be provided from controlling the current and interrogating the optical fiber over time. Additional apparatus, systems, and methods are disclosed.

18 Claims, 15 Drawing Sheets

(51) Int. Cl.
*G01V 3/20* (2006.01)
*G01V 3/02* (2006.01)

(56) References Cited

U.S. PATENT DOCUMENTS

| | | |
|---|---|---|
| 2011/0198078 A1 | 8/2011 | Harrigan et al. |
| 2013/0293235 A1 | 11/2013 | Bloemenkamp et al. |
| 2014/0222343 A1* | 8/2014 | Samson .................. G01V 3/12 |
| | | 702/8 |
| 2014/0367092 A1* | 12/2014 | Roberson ................ E21B 47/01 |
| | | 166/250.01 |
| 2016/0003962 A1 | 1/2016 | Sena |
| 2016/0259085 A1* | 9/2016 | Wilson ................. E21B 47/135 |
| 2018/0135405 A1* | 5/2018 | Fouda .................. E21B 47/047 |
| 2018/0328793 A1* | 11/2018 | Donderici .............. G01K 11/32 |

FOREIGN PATENT DOCUMENTS

| | | |
|---|---|---|
| WO | WO 2015/147800 A1 | 10/2015 |
| WO | WO 2015/160347 A1 | 10/2015 |
| WO | WO 2015/178876 A1 | 11/2015 |
| WO | WO 2015/178878 A1 | 11/2015 |
| WO | WO-2016060678 A1 * | 4/2016 ........... E21B 47/005 |
| WO | WO 2016/195715 A1 | 12/2016 |
| WO | WO 2017/086956 A1 | 5/2017 |
| WO | WO 2017/105467 A1 | 6/2017 |

\* cited by examiner

ENHANCEMENT OF DYNAMIC RANGE OF ELECTRODE MEASUREMENTS

PRIORITY

The present application is a U.S. National Stage patent application of International Patent Application No. PCT/US2017/018959, filed on Feb. 22, 2017, the benefit of which is claimed and the disclosure of which is incorporated herein by reference in its entirety.

TECHNICAL FIELD

The present invention relates generally to apparatus and methods with respect to measurements related to oil and gas exploration.

BACKGROUND

Distributed Fiber optic-based electromagnetic (EM) reservoir monitoring systems are being developed for permanent downhole deployment. One application of such permanent monitoring systems is the detection of flood front of a waterflood before the flood front hits a production well in enhanced oil recovery environments. Herein, waterflooding is a process of injecting fluid into an oil field to stimulate oil production. Waterflooding is not limited to injecting water, as other fluids can be used. Monitoring systems can be induction-based systems, which use coils as transmitters to induce currents in the formation, or conduction-based systems, which use electrodes or casing as a source to inject current into the formation.

The principle of operation of these different monitoring systems is the same: generate magnetic/electric/electromagnetic field in the formation, and measure a signal that is proportional to the resistivity (Rt) of the formation in the vicinity of transmitter/receiver. As waterflood approaches, the effective Rt changes due to the difference between waterflood Rt and the Rt of formation fluids that were displaced by the waterflood. By conducting time-lapse measurements, the progress of the waterflood can be detected, and parameters related to the waterflood can be estimated. Such parameters can include, but are not limited to, Rt contrast, distance to flood front, a shape, and other parameters.

One challenge facing permanent monitoring systems is that the signal due to waterflood may represent only a small fraction, sometimes 1% or less, of the total measured signal. This situation is likely the case in scenarios involving flood fingering, low contrast waterflood, or deep waterflood detection such as 50 ft. away or more. In these cases, the sensors are required to have high dynamic range enough to resolve the signal due to waterflood. This high dynamic range may be hard to achieve by many practical sensors.

DETAILED DESCRIPTION

Figure 1A:
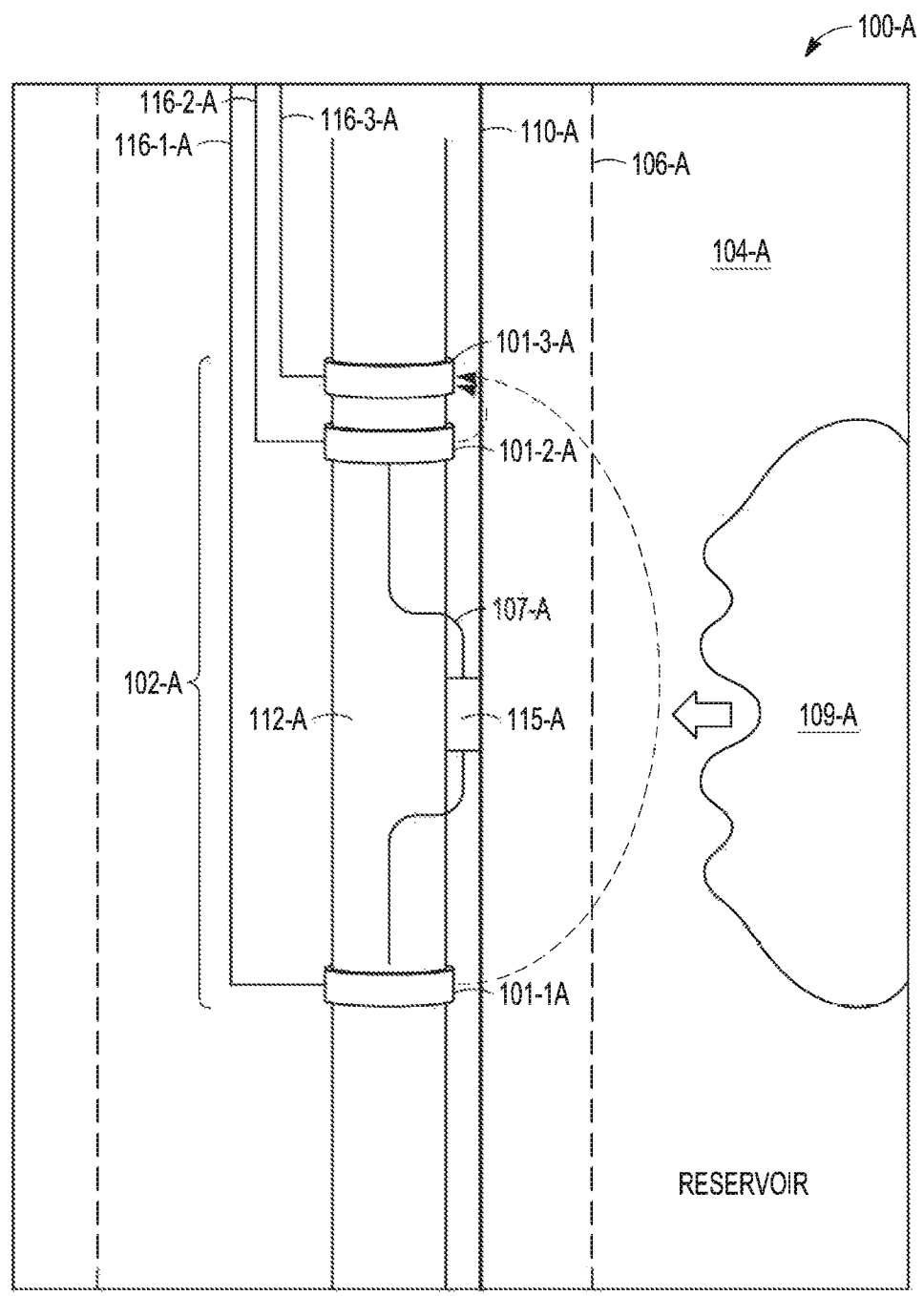
FIG. 1A is a schematic representation of an arrangement of a bipole with a bucking electrode for a system to monitor detection of a flood front of a waterflood in a formation, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, electrical, and mechanical changes may be made to these embodiments. The various embodiments are not necessarily mutually exclusive, as some embodiments can be combined with one or more other embodiments to form new embodiments. The following detailed description is, therefore, not to be taken in a limiting sense.

Systems and methods of acquiring, processing, and imaging EM data acquired from an EM system with fiber optic EM sensors deployed behind casing are being developed. Methods are being developed to improve the dynamic range of magnetic field coils. In addition, other methods are directed to improve dynamic range of directional sensitive galvanic measurements about casing.

In various embodiments, methods for improving the dynamic range of electrode measurements outside well casing for permanent reservoir monitoring can be implemented. Such methods for improving the dynamic range of electrode measurements can be realized using electric bipoles deployed outside the casing. An electric bipole, which can be referred to herein as a bipole, includes two current electrodes operatively arranged in a current path with different polarity. The difference in polarity can arise from on current electrode used for injection and the other current electrode used as return based on the injection. Bipoles can be used in various arrangements to use current focusing conditions, similar to those used in laterolog tools, such as dual laterolog (DLL) and array laterolog (ALAT) tools, to nullify or reduce a measured signal in the absence of waterflood. A measured signal in the absence of waterflood is herein referred to as a direct signal. An arrangement to nullify or reduce a measured signal is said to buck the measured signal. As the waterflood approaches, the majority of the measured signal will be generated by the waterflood, where the signal generated by the waterflood is referred to as a flood signal. Therefore, with the bipoles arranged with a bucking mechanism, the entire dynamic range of a sensor can be effectively used to measure flood signal without being cluttered with direct signal.

Electric bipoles can be arranged for reservoir monitoring. In a measurement arrangement, a conventional electric bipole consists of a pair of spatially separated electrodes. Electric current, of known intensity, is injected from one electrode of the electric bipole and returns at the other electrode. Depending on the formation, a typical spacing between the electrodes of the electric bipole is around 15 to 30 ft. In arrangements as taught herein, transmitters can be mounted on the casing collars. In the vicinity of the casing, generated electric field is parallel to the casing and, therefore, the length of the casing spanned by the bipoles must be insulated to avoid shorting out the electric field. In these arrangements, the nature of the electrical insulation is not limited to a particular type of electrical insulation. Examples of electrical insulation can include, but are not limited to, a paint coating, a ceramic coating, a fiber glass casing, etc. The casing itself can be electrically insulated.

In the conventional arrangement of multiple bipoles, to ensure that the field produced by a given bipole is independent of the geology of the formation at the locations of other bipoles, one bipole is operated at a time. This requires multiplexing circuitry to switch between electrode pairs. Such multiplexing enables realizing bipoles with variable lengths, which can be multiples of the shortest separation of an electrode pair, that are sensitive to variable depths of investigation. The larger the spacing between injection and return electrodes, the larger is the depth of investigation. A receiver can be located between electrodes of each pair of electrodes, where the receiver measure the potential difference between two vertically spaced points. These points are referred to as the monitoring electrodes. The injection/return electrodes can be used as monitoring electrodes, or monitoring electrodes can be included as separate electrodes arbitrarily situated between injection and return electrodes. In general, measured voltage is proportional to the spacing between the monitoring electrodes. Using injection/return electrodes as the monitoring electrodes ensures a largest measured signal; however, if the spacing between injection and return electrodes is large (30 ft or more), it might be more practical to use dedicated monitoring electrodes at shorter spacing to avoid long wiring and improve vertical resolution.

In a conventional bipole arrangements for any given current IA1, $$IA1+IA2=0$$

where IA1 and IA2 is the current at the two electrodes of the bipole. As discussed before, the majority of the measured signal in this case is a direct (or background) signal that is always present even in the absence of waterflood.

In various embodiments, to reduce (or ideally cancel out) the direct signal, a third electrode is added (relative to the conventional arrangement) as a bucking electrode that is placed close to a return electrode of a bipole. FIG. 1A is a schematic representation of an arrangement 100-A of a bipole with a bucking electrode for a system to monitor detection of a flood front of a waterflood 109-A in a formation 104-A. The arrangement 100-A includes a set 102-A of electrodes disposed on a pipe 112-A in a wellbore 106-A, the set 102-A having three current electrodes 101-1-A, 101-2-A, and 101-3-A operable to inject current into a formation 104-A around the pipe 112-A in the wellbore 106-A. The pipe 112-A can be an insulated casing or other pipe structure in a production well that is appropriately insulated. One electrode (electrode 101-3-A) of the three current electrodes 101-1-A, 101-2-A, and 101-3-A of the set 102-A can operatively be arranged as a return for current flow. The set 102-A can be arranged such that two current electrodes 101-1-A and 101-2-A, which are excitation electrodes, are also operative as two monitor electrodes. In the arrangement 101-A, electrodes 101-1-A and 101-3-A can constitute a bipole with electrode 101-2-A being a bucking electrode. Typically, the spacing from electrode 101-2-A to electrode 101-3-A can be chosen to be shorter than the spacing from electrode 101-1-A to electrode 101-2-A.

The arrangement 100-A can include three separate power lines 116-1-A, 116-2-A, and 116-3-A in respective power cables coupled to the three current electrodes 101-1-A, 101-2-A, and 101-3-A, respectively. With the electrodes 101-1-A and 101-2-A used as monitor electrodes, a voltage difference can be applied to an electro-optic transducer 115-A, disposed along the pipe 112-A, via electrical wires 107-A from the electrodes 101-1-A and 101-2-A in response to the excitation applied by the electrodes 101-1-A and 101-2-A. The electro-optic transducer 115-A can be coupled to a portion of an optical fiber 110-A to communicatively provide a signal to the surface from an interaction of the electro-optic transducer 115-A with the optical fiber 110A. The response of the formation to the current excitation by the set 102-A is conveyed to the optical fiber via changes imparted to the electro-optic transducer 115-A from coupling to the monitor electrodes 101-1-A and 101-2-A. The optical fiber 110-A in the arrangement 101-A extends along the longitudinal axis of the pipe 112-A with a portion of the optical fiber 110-A associated with the set of electrodes 101-1-A, 101-2-A, and 101-3-A in a sensing operation of the set of electrodes 101-1-A, 101-2-A, and 101-3-A.

Though one set 102-A of electrodes are shown attached to the pipe 112-A, additional sets of electrodes can be attached to the pipe 112-A. The electrodes in each additional set can be arranged with an electro-optic transducer for the set coupled to a portion of the optical fiber 110-A as shown in FIG. 1A. The plurality of sets of electrodes, with each set arranged as shown in FIG. 1A, allows for monitoring along a length of the pipe 112-A.

Figure 1B:
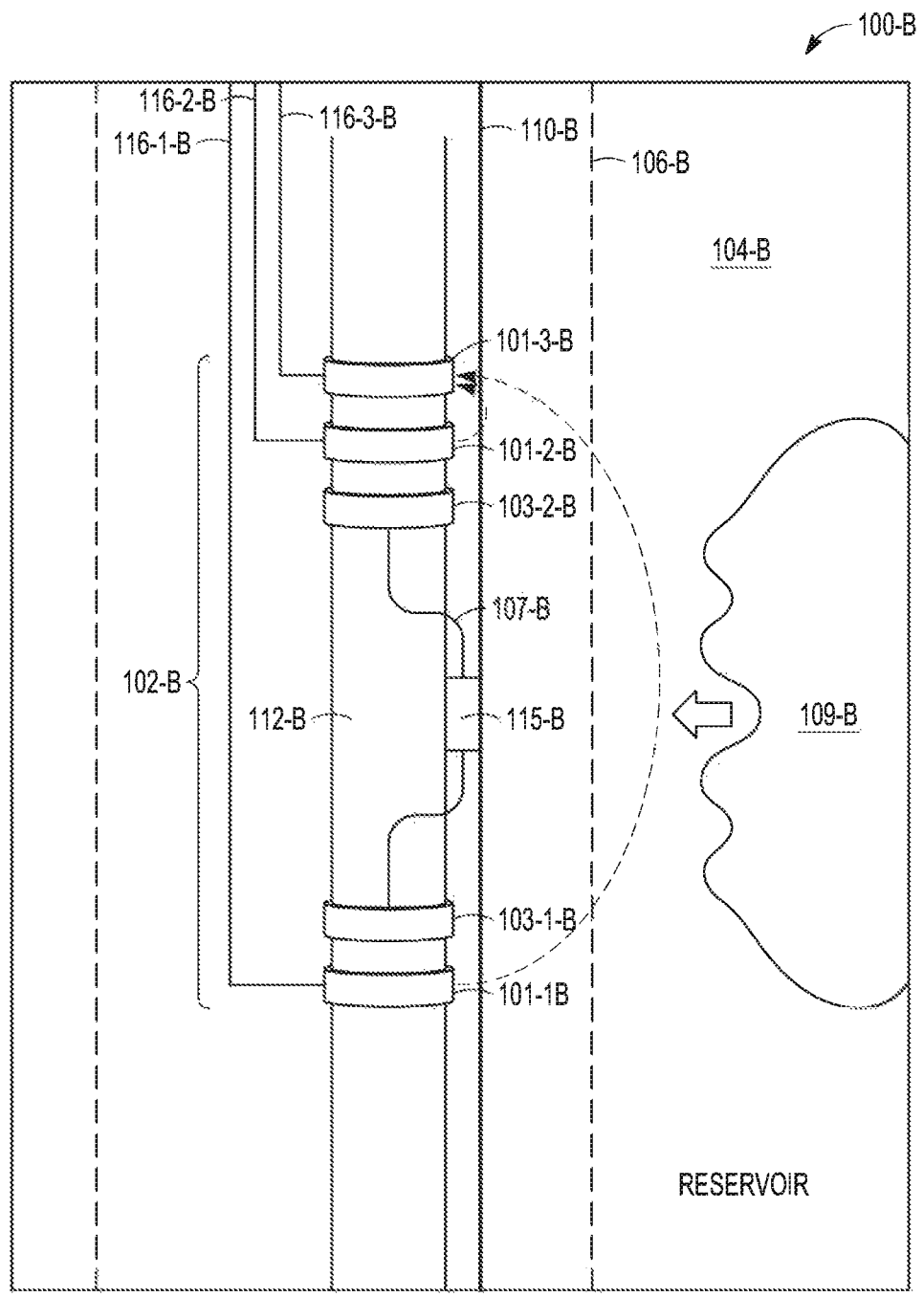
FIG. 1B is a schematic representation of an arrangement of a bipole with a bucking electrode and monitor electrodes separate from excitation electrodes for a system to monitor detection of a flood front of a waterflood in a formation, in accordance with various embodiments.

FIG. 1B is a schematic representation of an arrangement 100-B of a bipole with a bucking electrode and monitor electrodes separate from excitation electrodes for a system to monitor detection of a flood front of a waterflood 109-B in a formation 104-B. The arrangement 100-B includes a set 102-B of electrodes disposed on a pipe 112-B in a wellbore 106-B, the set 102-B having three current electrodes 101-1-A, 101-2-A, and 101-3-A operable to inject current into a formation 104-A around the pipe 112-A in the wellbore 106-A. The pipe 112-B can be an insulated casing or other pipe structure in a production well that is appropriately insulated. The set 102-B can include two monitor electrodes 103-1-B and 103-2-B. One electrode (electrode 101-3-B) of the three current electrodes 101-1-B, 101-2-B, and 101-3-B of the set 102-B can operatively be arranged as a return for current flow. In the arrangement 101-B, electrodes 101-1-B and 101-3-B can constitute a bipole with electrode 101-2-B being a bucking electrode. The monitor electrodes 103-1-B and 103-2-B are disposed between electrodes 101-1B and 101-2B. As in the arrangement 101-A, the spacing from electrode 101-2-B to electrode 101-3-B can be chosen to be shorter than the spacing from electrode 101-1-B to electrode 101-2-B.

The arrangement 100-B can include three separate power lines 116-1-B, 116-2-B, and 116-3-B coupled to the three current electrodes 101-1-B, 101-2-B, and 101-3-B, respectively. A voltage difference can be applied to an electro-optic transducer 115-B disposed along the pipe 112-B via electrical wires 107-B from the monitor electrodes 103-1-B and 103-2-B in response to the excitation applied by the electrodes 101-1-B and 101-2-B. The electro-optic transducer 115-B can be coupled to a portion of an optical fiber 110-B to communicatively provide a signal to the surface from an interaction of the electro-optic transducer 115-B with the optical fiber 110B. The response of the formation to the current excitation by the set 102-B is conveyed to the optical fiber via changes imparted to the electro-optic transducer 115-B from coupling to the monitor electrodes 103-1-B and 103-2-B. The optical fiber 110-B in the arrangement 101-B extends along the longitudinal axis of the pipe 112-B with a portion of the optical fiber 110-B associated with the set of electrodes 101-1-B, 101-2-B, and 101-3-B and monitor electrodes 103-1-B and 103-2-B in a sensing operation of the set 102-B.

Similar to arrangement 100-A, though one set 102-B of electrodes are shown attached to the pipe 112-B, additional sets of electrodes can be attached to the pipe 112-B. The electrodes in each additional set can be arranged with an electro-optic transducer for the set coupled to a portion of the optical fiber 110-B as shown in FIG. 1B. The plurality of sets of electrodes, with each set arranged as shown in FIG. 1B, allows for monitoring along a length of the pipe 112-B.

With respect to systems having the arrangement 100-A or arrangement 100-B, in the absence of waterflood right after deployment, for any given current IA1 at electrode 101-1-A or electrode 101-1-B, current IA2 at electrode 101-2-A or electrode 101-2-A, respectively, can be adjusted so that the following conditions hold VA1=VA2 with no waterflood $$IA1+IA2+IA3=0$$

where IA3 is current at electrode 101-3-A or 101-3-B, VA1 is the voltage at electrode 101-1-A or monitor electrode 103-1-B with VA2 being the voltage at electrode 101-2-A or monitor electrode 103-2-B, respectively. This ensures zero or very little signal in the absence of waterflood. Values of IA1 and IA2 are then fixed during subsequent time-lapse measurements. IA1 is referred to as the main current and IA2 is referred to as the bucking current.

As waterflood approaches, the above voltage balance condition is perturbed, and non-zero voltage is measured. If bucking is perfect, measured signal will be entirely due to waterflood, and hence the full dynamic range of the sensors can be used to resolve the sought-after flood signal. The above bucking and measurement approach is referred to as "baseline bucking" since VA1−VA2=0 only in the baseline measurement, which is conducted with no waterflood. A flowchart of this approach is given in FIG. 2.

Figure 2:
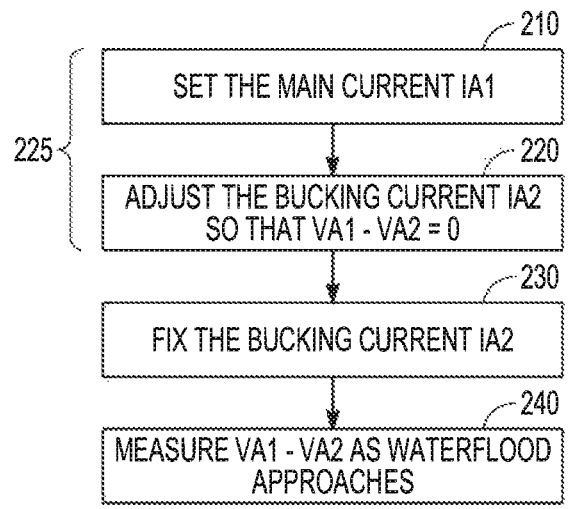
FIG. 2 is a flowchart of features of a baseline bucking approach, in accordance with various embodiments.

FIG. 2 is a flowchart of features of an embodiment of an example baseline bucking approach. At 210, the main current IA1 is set. At 220, the bucking current is adjusted so that VA1−VA2=0. The completion of 210 and 220 provides a baseline measurement 225. At 230, the bucking current IA2 is fixed. At 240, VA1−VA2 is measured as the waterflood approaches. Bucking current is computed once to buck the baseline measurement, and then fixed thereafter in subsequent measurements. The potential difference VA1−VA2 is used as an indication of approaching waterflood.

Alternatively, the bucking current IA2 can be continuously adjusted through hardware to keep the voltage measurement bucked, that is, VA1−VA2=0, at all times. The value of the bucking current can be used in determining waterflood approaching and interpretation of the formation status. This approach is referred to as "continuous bucking." A flowchart of this approach is given in FIG. 3.

Figure 3:
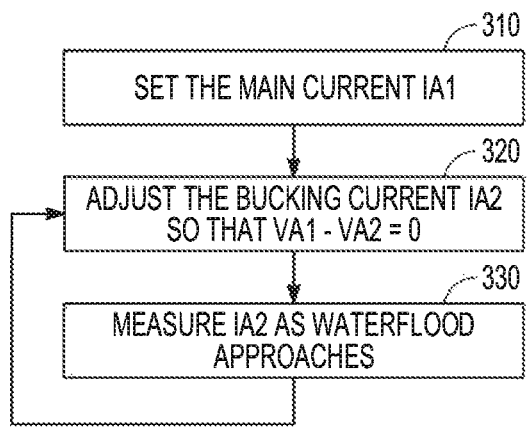
FIG. 3 is a flowchart of features of an example continuous bucking approach, in accordance with various embodiments.

FIG. 3 is a flowchart of features of an embodiment of an example continuous bucking approach. At 310, the main current IA1 is set. At 320, the bucking current IA2 is adjusted so that VA1−VA2=0. At 330, the bucking current IA2 is measured as the waterflood approaches. From 330, the process proceeds back to 320 to adjust the bucking current IA2 and then measure the bucking current IA2. This loop from 320 to 330 back to 320 can be continued providing the continuous bucking approach.

Figure 4A:
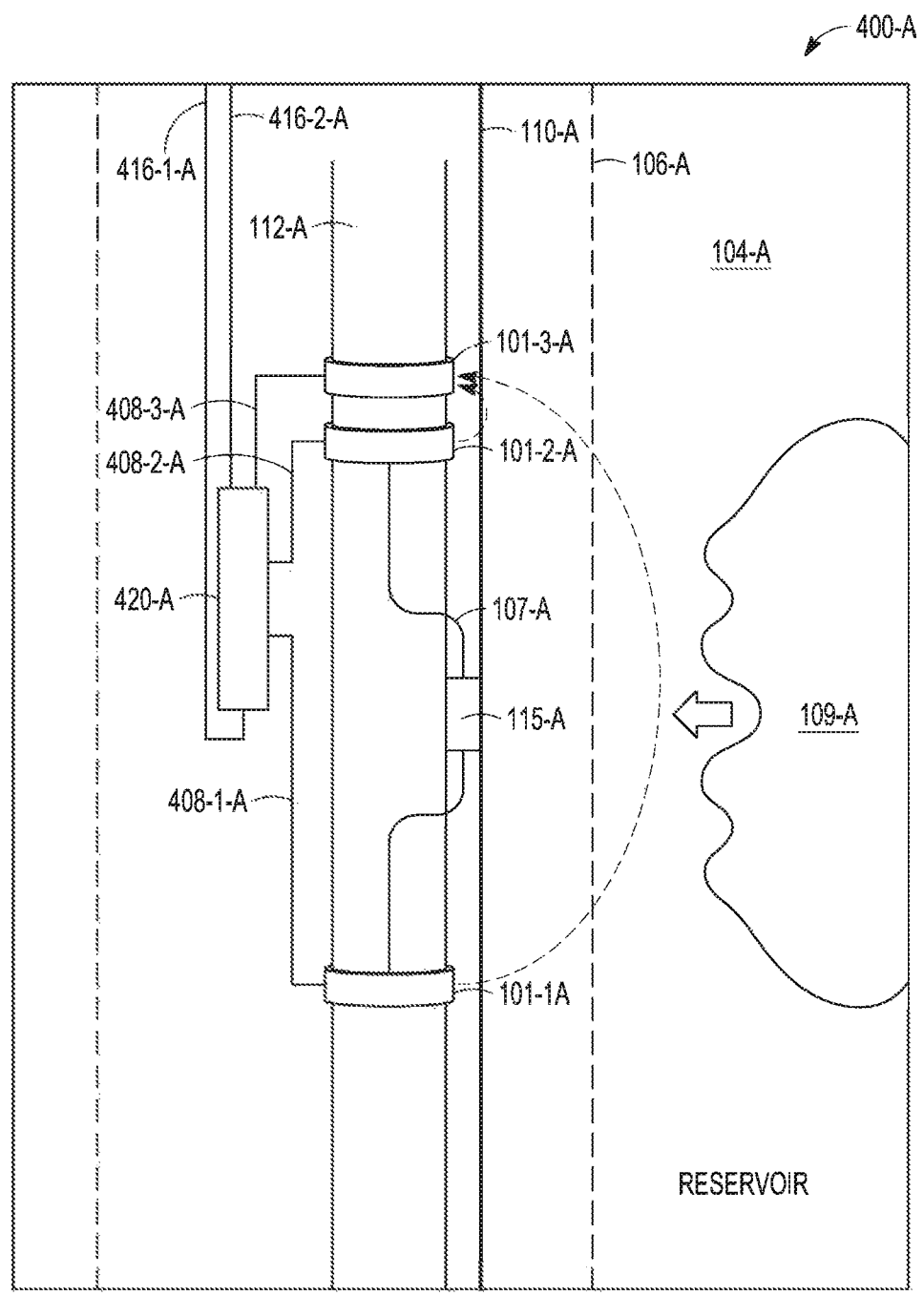
FIG. 4A is a schematic representation of bucking performed using downhole electronics, where monitoring electrodes are the same as excitation electrodes, in accordance with various embodiments.

FIG. 4A is a schematic representation of bucking performed using downhole electronics 420-A, where monitoring electrodes are the same as excitation electrodes. FIG. 4A is a schematic representation of an arrangement 400-A of a bipole with a bucking electrode for a system to monitor detection of a flood front of a waterflood 109-A in a formation 104-A. The arrangement 400-A can be realized by the arrangement 100-A modified such that instead of running 3 separate power lines 116-1-A, 116-2-A, and 116-3-A from the surface as in FIG. 1A, bucking can be performed downhole using the downhole electronics 420-A. In this case as shown in FIG. 4A, a single power line 416-1-A is extended from the surface to the downhole electronics 420-A with a return line 416-2-A to the surface. The current from the single power line 416-1-A is electronically separated in the downhole electronics 420-A into main and bucking currents based on a separate voltage measurement across the electrodes 101-1-A and 101-2-A. The electrodes 101-1-A, 101-2-A, and 101-3-A are coupled to the downhole electronics 420-A by wires 408-1-A, 408-2-A, and 408-3-A, respectively.

Figure 4B:
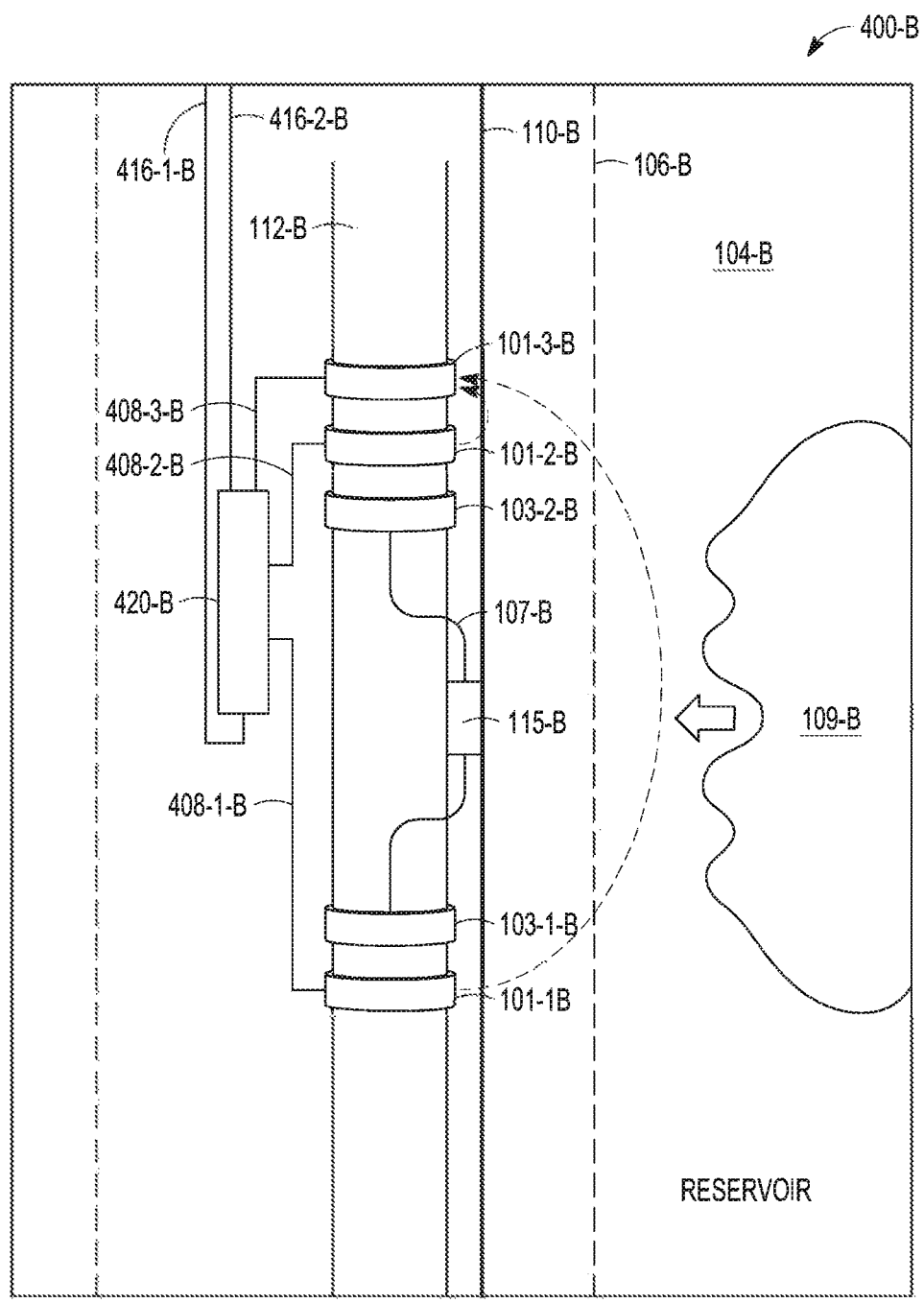
FIG. 4B is a schematic representation of bucking performed using downhole electronics with monitoring electrodes being separate from the excitation electrodes, in accordance with various embodiments.

FIG. 4B is a schematic representation of bucking performed using downhole electronics 420-B with monitoring electrodes being separate from the excitation electrodes. FIG. 4B is a schematic representation of an arrangement 400-B of a bipole with a bucking electrode for a system to monitor detection of a flood front of a waterflood 109-A in a formation 104-A. The arrangement 400-B can be realized by the arrangement 100-B of FIG. 1B modified such that instead of running 3 separate power lines 116-1-B, 116-2-B, and 116-3-B from the surface as in FIG. 1B, bucking can be performed downhole using the downhole electronics 420-B. In this case as shown in FIG. 4B, a single power line 416-1-B is extended from the surface to the downhole electronics 420-B with a return line 416-2-B to the surface. The current from the single power line 416-1-B is electronically separated in the downhole electronics 420-B into main and bucking currents based on a separate voltage measurement across the monitor electrodes 103-1-B and 103-2-B. The electrodes 101-1-B, 101-2-B, and 101-3-B are coupled to the downhole electronics 420-B by wires 408-1-B, 408-2-B, and 408-3-B, respectively.

In various embodiments, in arrangement of bipoles and bucking electrodes, bipoles can be simultaneously excited with multiple frequencies, where lower frequencies have deeper depth of investigation and higher frequencies have sallower depth of investigation. This radial profiling in sensitivity is useful in determining the distance to flood front. Multiple frequencies can be bucked at the same time using bucking current with different amplitudes. In this case, $$IA1 = IA1, f1 + IA1, f2 + \ldots + IA1, fN$$

$$IA2 = IA2, f1 + IA2, f2 + \ldots + IA2, fN$$

$$IA3 = IA3, f1 + IA3, f2 + \ldots + IA3, fN$$

where VA1, fi−VA2, fi=0, for i=1, 2, ... N in the absence of waterflood
and IA1=fi+IA2,fi+IA3,fi=0
with VAj,fi being voltage associated with the jth electrode for frequency fi. Multiple voltage sensors each tuned to one of the excitation frequencies are used in this approach.

Figure 5A:
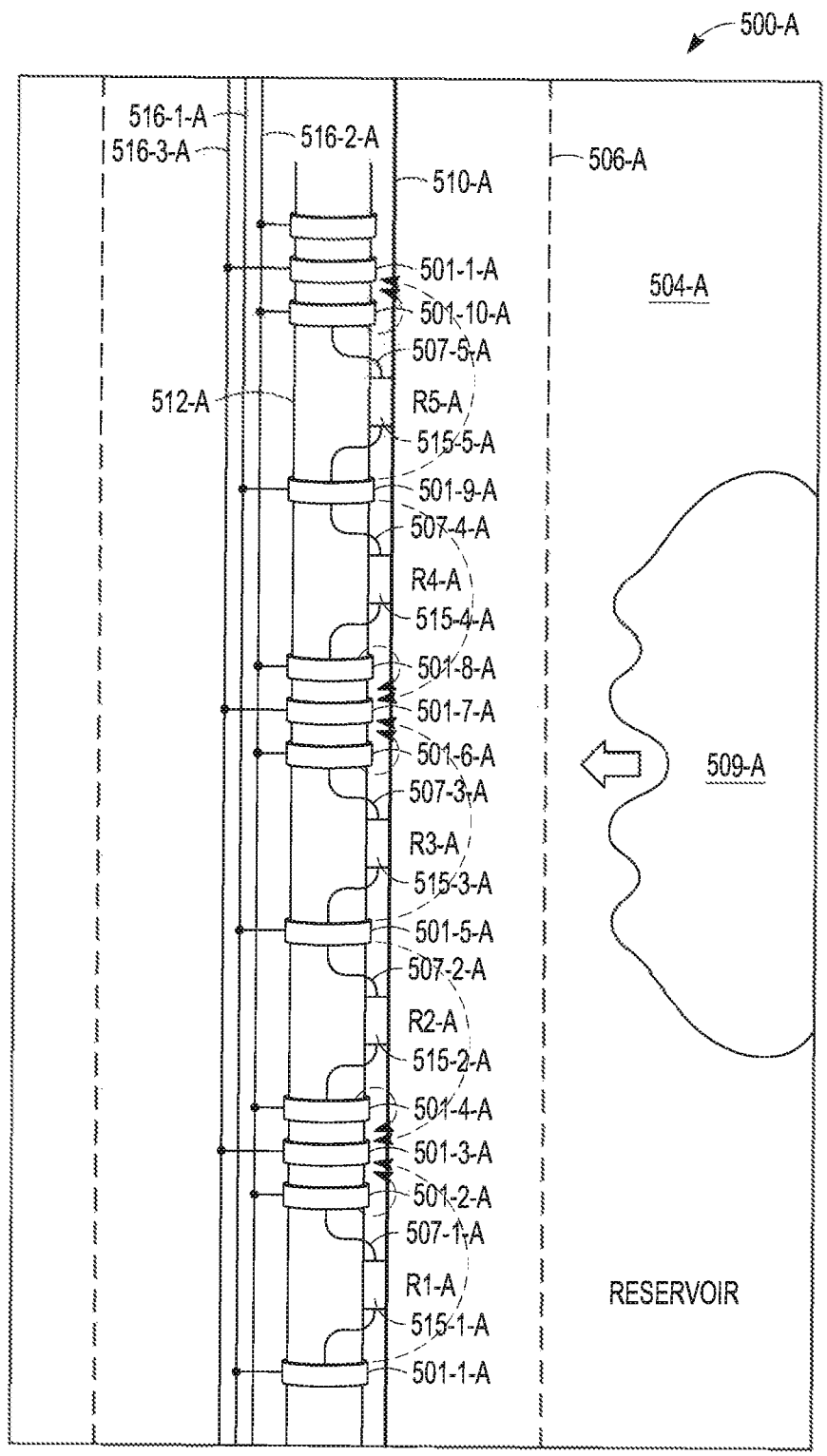
FIG. 5A is a schematic representation of an arrangement of multiplexing multiple bipoles and bucking electrodes with monitoring electrodes being the same as excitation electrodes to monitor detection of a flood front of a waterflood in a formation, in accordance with various embodiments.
Figure 5B:
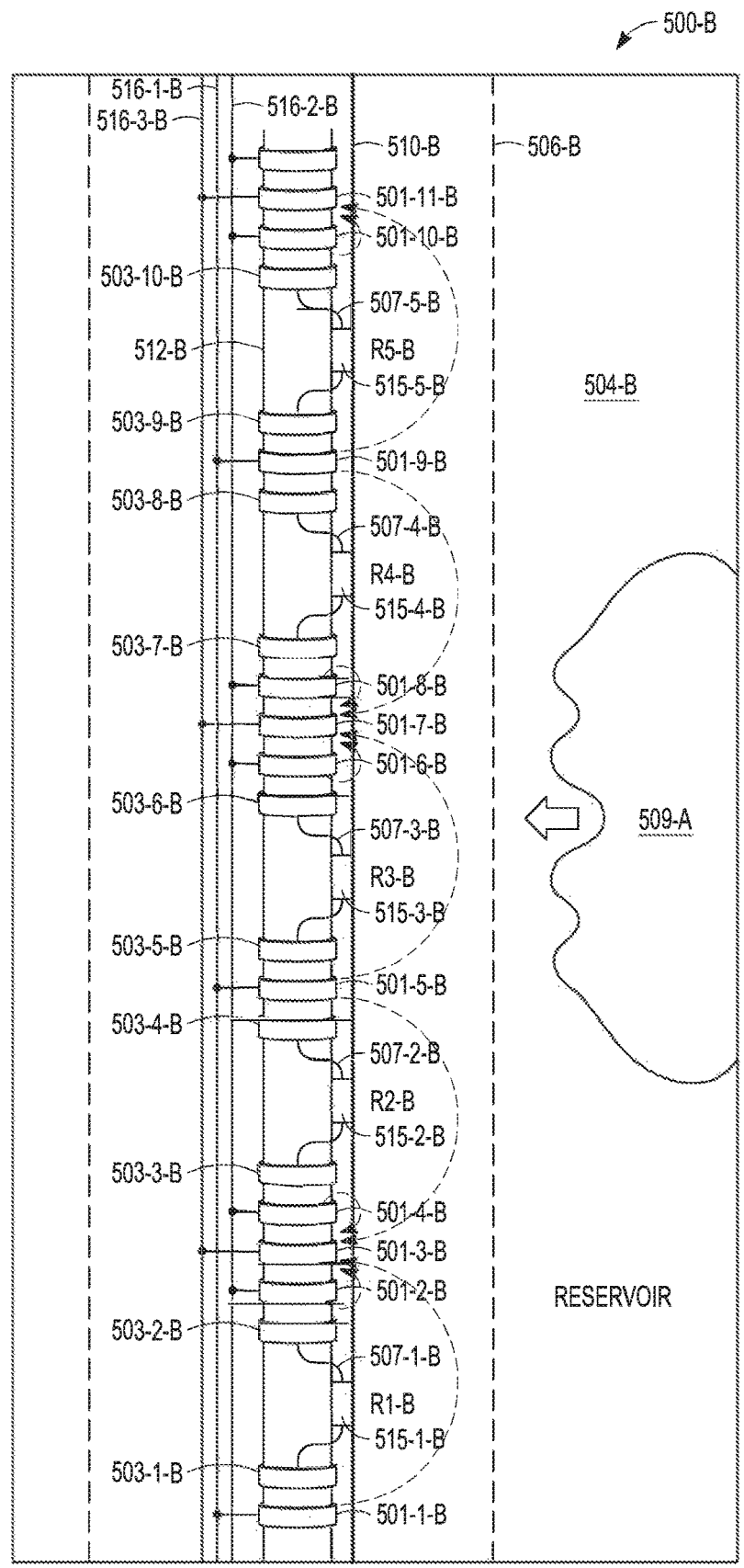
FIG. 5B is a schematic representation of multiplexing multiple bipoles with monitoring electrodes separate from excitation electrodes, in accordance with various embodiments.

FIG. 5A is a schematic representation of an arrangement 500-A of multiplexing multiple bipoles and bucking electrodes with monitoring electrodes being the same as excitation electrodes to monitor detection of a flood front of a waterflood 509-A in a formation 504-A. Arrangement 500-A is similar to arrangement 100-A, but with additional sets of electrodes. FIG. 5A shows the arrangement 500-A, where multiple bipoles are connected in parallel to three power lines 516-1-A, 516-2-A, and 516-3-A with each bipole having an associated bucking electrode. The arrangement 500-A includes five sets R1-A, R2-A, R3-A, R4-A, R5-A of electrodes disposed on a pipe 512-A in a wellbore 506-A, each set associated with three current electrodes operable to inject current into a formation 504-A around the pipe 512-A in the wellbore 506-A. One of the three current electrodes of each set can be operatively arranged as a return. Though five sets are shown in FIG. 5B, more or less number of sets may the implemented. The pipe 512-A can be an insulated casing or other pipe structure in a production well that is appropriately insulated. Each of the sets R1-A, R2-A, R3-A, R4-A, and R5-A share one or more of its three current electrodes with another set. Set R1-A includes electrodes 501-1-A, 501-2-A, and 501-3-A. Set R2-A includes electrodes 501-3-A, 501-4-A, and 501-5-A. Set R3-A includes electrodes 501-5-A, 501-6-A, and 501-7-A. Set R4-A includes electrodes 501-7-A, 501-8-A, and 501-9-A. Set R5-A includes electrodes 501-9-A, 501-10-A, and 501-11-A. Electrode 501-3-A is shared by set R1-A and set R2-A. Electrode 501-5-A is shared by set R2-A and set R3-A. Electrode 501-7-A is shared by set R3-A and set R4-A. Electrode 501-5-A is shared by set R4-A and set R5-A. Along a length of the pipe 512-A, each of sets R2-A, R3-A, R4-A share electrodes with the next set on both sides of the respective set. With sets R1-A and R5-A being the ends of a series of concatenated sets, sets R1-A and R5-A share electrodes with one set.

One or more additional electro-optic transducers can be disposed in a one-to-one correspondence with the sets R1-A, R2-A, R3-A, R4-A, and R5-A of electrodes. The electrodes operatively providing main current and bucking current that also operatively provide monitoring in each set R1-A, R2-A, R3-A, R4-A, and R5-A can be coupled to electro-optic transducers 515-1-A, 515-2-A, 515-3-A, 515-4-A, and 515-5-A, respectively, via electrical wires 507-1-A, 507-2-A, 507-3-A, 507-4-A, and 507-5-A, respectively. Each electro-optic transducers 515-1-A, 515-2-A, 515-3-A, 515-4-A, and 515-5-A can be coupled to optical fiber 510-A.

As shown in FIG. 5A, a first current electrode of the three current electrodes of each set can be coupled to first power line 516-1-A to operatively provide a main current from the respective set to the formation. A second current electrode of the three current electrodes of each set can be coupled to second power line 516-2-A to operatively provide a bucking current from the respective set to the formation. A third current electrode of the three current electrodes of each set can be coupled to third power line 516-3-A to operatively provide a return.

Current in power line 516-2-A, which is bucking current, can be adjusted to reduce the total direct signal received by all receivers in the sets R1-A, R2-A, R3-A, R4-A, R5-A, allowing for simultaneous measurements with improved dynamic range. Alternatively, bucking current can be adjusted to buck direct signal at one receiver in one set at a time such that signals are measured successively.

FIG. 5B is a schematic representation of multiplexing multiple bipoles with monitoring electrodes separate from excitation electrodes. FIG. 5B illustrates an arrangement 500-B of multiplexing multiple bipoles and bucking electrodes with separate monitoring electrodes to monitor detection of a flood front of a waterflood 509-B in a formation 504-B. Arrangement 500-B is similar to arrangement 100-B, but with additional sets of electrodes. In the arrangement 500-B of FIG. 5B multiple bipoles are connected in parallel to three power lines 516-1-B, 516-2-B, and 516-3-B with each bipole having an associated bucking electrode. The arrangement 500-B includes five sets R1-B, R2-B, R3-B, R4-B, R5-B of electrodes disposed on a pipe 512-B in a wellbore 506-B, each set associated with three current electrodes operable to inject current into a formation 504-B around the pipe 512-B in the wellbore 506-B and two monitor electrodes. One of the three current electrodes of each set can be operatively arranged as a return. Though five sets are shown in FIG. 5B, more or less number of sets may the implemented. The pipe 512-B can be an insulated casing or other pipe structure in a production well that is appropriately insulated.

Set R1-B includes electrodes 501-1-B, 501-2-B, and 501-3-B and monitor electrodes 503-1-B and 503-2-B. Set R2-B includes electrodes 501-3-B, 501-4-B, and 501-5-B and monitor electrodes 503-3-B and 503-4-B. Set R3-B includes electrodes 501-5-B, 501-6-B, and 501-7-B and monitor electrodes 503-5-B and 503-6-B. Set R4-B includes electrodes 501-7-B, 501-8-B, and 501-9-B and monitor electrodes 503-7-B and 503-8-B. Set R5-B includes electrodes 501-9-B, 501-10-B, and 501-11-B and monitor electrodes 503-9-B and 503-10-B. Each of the sets R1-B, R2-B, R3-B, R4-B, and R5-B share one or more of its three current electrodes with another set. Electrode 501-3-B is shared by set R1-B and set R2-B. Electrode 501-5-B is shared by set R2-B and set R3-B. Electrode 501-7-B is shared by set R3-B and set R4-B. Electrode 501-5-B is shared by set R4-B and set R5-B. Along a length of the pipe 512-B, each of sets R2-B, R3-B, R4-B share electrodes with the next set on both sides of the respective set. With sets R1-B and R5-B being the ends of a series of concatenated sets, sets R1-B and R5-B share electrodes with one set.

One or more additional electro-optic transducers can be disposed in a one-to-one correspondence with the sets R1-B, R2-B, R3-B, R4-B, and R5-B of electrodes. Monitoring electrodes in each set R1-B, R2-B, R3-B, R4-B, and R5-B can be coupled to electro-optic transducers 515-1-B, 515-2-B, 515-3-B, 515-4-B, and 515-5-B, respectively, via electrical wires 507-1-B, 507-2-B, 507-3-B, 507-4-B, and 507-5-B, respectively. Each electro-optic transducers 515-1-B, 515-2-B, 515-3-B, 515-4-B, and 515-5-B can be coupled to optical fiber 510-B.

As shown in FIG. 5B, a first current electrode of the three current electrodes of each set can be coupled to first power line 516-1-B to operatively provide a main current from the respective set to the formation. A second current electrode of the three current electrodes of each set can be coupled to second power line 516-2-B to operatively provide a bucking current from the respective set to the formation. A third current electrode of the three current electrodes of each set can be coupled to third power line 516-3-B to operatively provide a return.

Current in power line 516-2-B, which is bucking current, can be adjusted to reduce the total direct signal received by all receivers in the sets R1-B, R2-B, R3-B, R4-B, R5-B, allowing for simultaneous measurements with improved dynamic range. Alternatively, bucking current can be adjusted to buck direct signal at one receiver in one set at a time such that signals are measured successively.

Figure 6A:
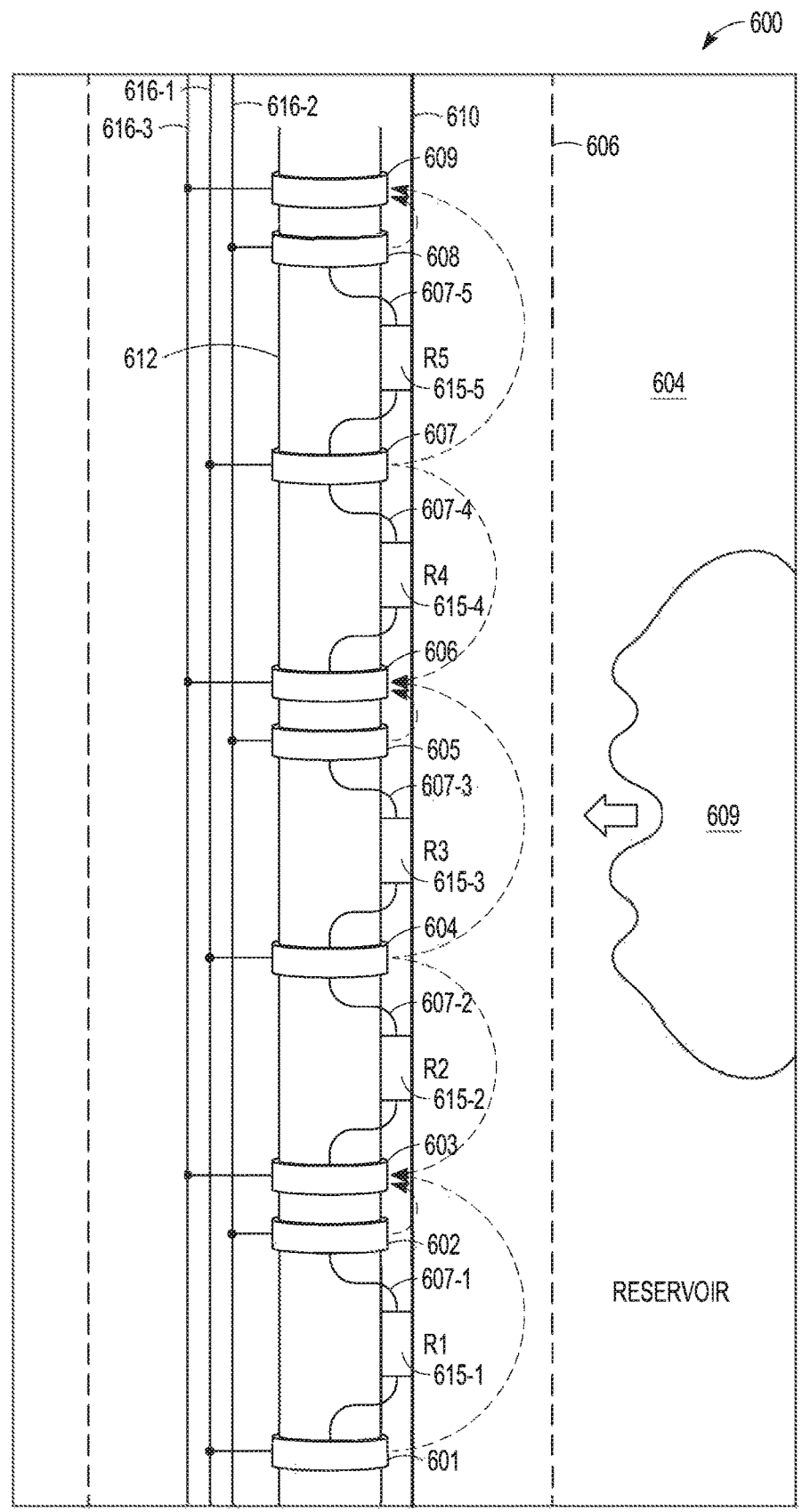
FIGS. 6A-6B are schematic representations of an alternative embodiment for multiplexing multiple bipoles on the same power lines in a two-cycle operation, in accordance with various embodiments.
Figure 6B:
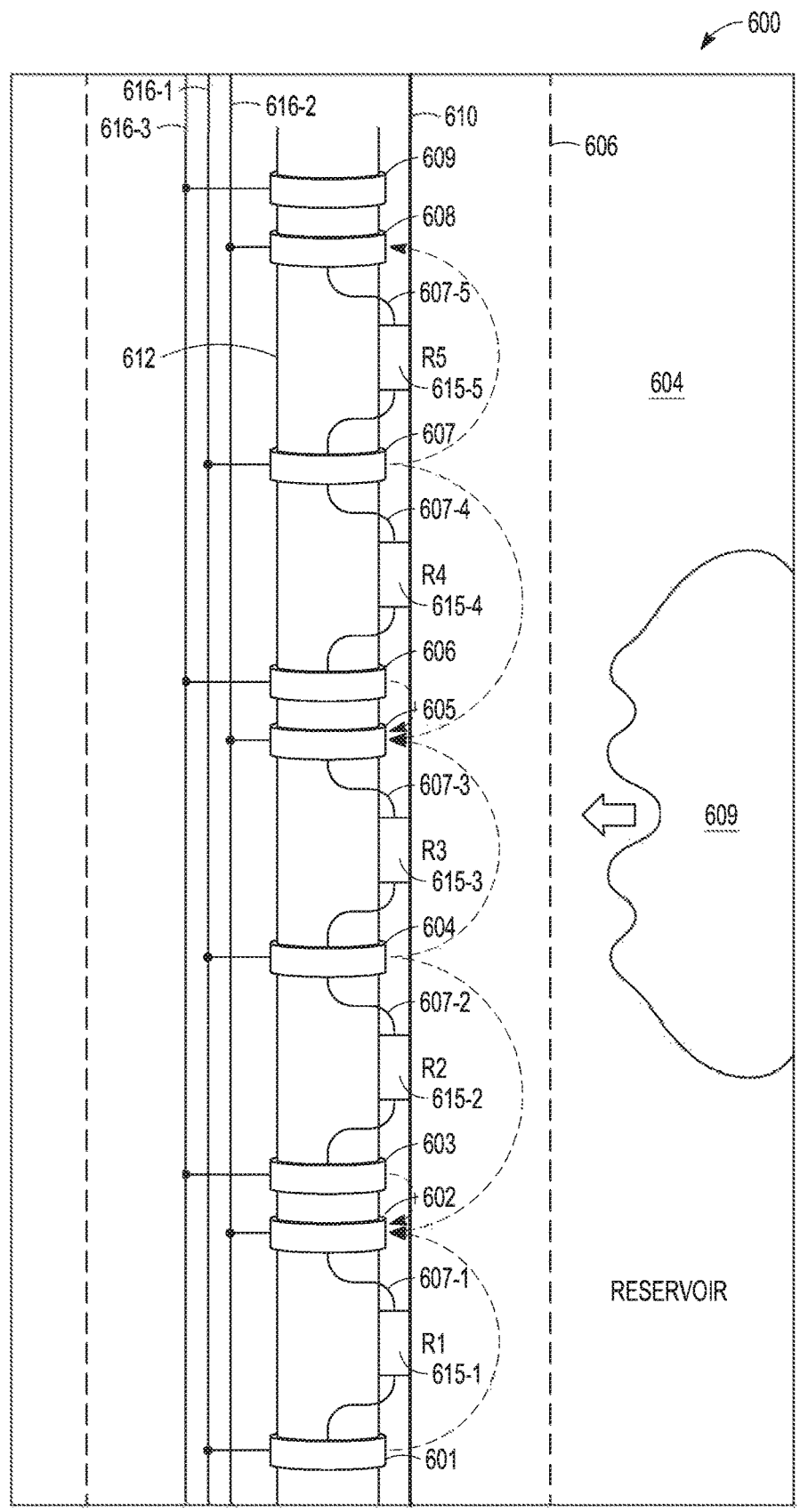

FIGS. 6A-6B are a schematic representation of an alternative embodiment for multiplexing multiple bipoles on the same power lines in a two-cycle operation. An arrangement 600-A can include sets of current electrodes, such R1, R2, R3, R4, R5, as disposed on a pipe 612 in a wellbore 606 to monitor detection of a flood front of a waterflood 609 in a formation 604. Though five sets are shown in FIG. 6, more or less number of sets may the implemented. As in other embodiments taught herein, the pipe 612 can be an insulated casing or other pipe structure in a production well that is appropriately insulated.

Each set can have three current electrodes operable to inject current into the formation 604 around the pipe 612 with one of the three current electrodes operatively arranged as a return. Each set can be structured to include two current electrodes of the three current electrodes to operatively be two monitor electrodes. Each set be operatively structured to share two of its three current electrodes with another set.

Set R1 includes electrodes 601, 602, and 603. Set R2 includes electrodes 602, 603, and 604. Set R3 includes electrodes 604, 605, and 606. Set R4 includes electrodes 604, 605, and 607. Set R5 includes electrodes 607, 608, and 609. Each of the sets R1, R2, R3, R4, and R5 share two of its three current electrodes with another set. Electrodes 602 and 603 are shared by set R1 and set R2. Electrodes 605 and 606 are shared by set R3 and set R4. If set R5 is an end of a series of concatenated sets along a length of the pipe 612, set R5 may not share two of its electrodes with another set.

One or more additional electro-optic transducers can be disposed in a one-to-one correspondence with the sets R1, R2, R3, R4, and R5 of electrodes. The electrodes of each set that also operate as monitoring electrodes in each set R1, R2, R3, R4, and R5 can be coupled to electro-optic transducers 615-1, 615-2, 615-3, 615-4, and 615-5, respectively, via electrical wires 607-1, 607-2, 607-3, 607-4, and 607-5, respectively. Each electro-optic transducer 615-1, 615-2, 615-3, 615-4, and 615-5 can be coupled to optical fiber 610.

As shown in FIG. 6, a first current electrode of the three current electrodes of each set can be coupled to a first power line 616-1. A second current electrode of the three current electrodes of each set can be coupled to a second power line 616-2. A third current electrode of the three current electrodes of each set can be coupled to a third power line 616-3.

FIG. 6A is a schematic representation of cycle one of a dual cycle multiplexing scheme. In the first cycle, with power line 616-1 injecting main current and power line 616-2 injecting bucking current, odd receivers, such as sets R1, R3, and R5, are compensated (bucked). The power line 616-3 is operated as a return. FIG. 6B is a schematic representation of cycle two of a dual cycle multiplexing scheme. In the second cycle, with power line 616-1 injecting main current and power line 616-3 injecting bucking current, even receivers, such as sets R2 and R4, are compensated. The power line 616-2 is operated as a return. Compared with the embodiment in FIG. 5A, the 2-cycle embodiment requires less number of electrodes. Though not shown, arrangement 600 can be modified similar to other embodiments, to use separate monitor electrodes coupled to the electro-optic transducers of FIGS. 6A-6B instead of connecting the current electrodes to the electro-optic transducers as shown.

In an embodiment, the current level in the bucking electrodes for two cycle operation can be determined before deployment given the transmitter/receiver spacing of the electrodes, and formation resistivity estimated from well logs. In another embodiment, the bucking current level can be determined after the casing is deployed and cemented in place by dynamically tuning the current in the bucking electrode while monitoring the signal at the receivers, which is a downhole calibration procedure. In various embodiments, different bucking current levels may be required for each receiver unit, which is a set of electrodes including separate monitor electrodes if used and associated electro-optic transducer, due to unequal spacings between transmitter/receiver pairs of electrodes and possible transmitter/receiver dislocation during deployment. In all cases, currents to buck the no flood signal at each receiver unit can be stored after calibration and applied afterwards to time-lapse measurements as the waterflood approaches. Given the bucking currents, the no flood signal can be computed and mathematically added to the measured flood signal if the total signal (no flood signal+flood signal) is used in inversion.

Receiver units, such as R1, R2, R3, R4, and R5, in one cycle can be grouped based upon their required bucking current levels. An average bucking current is applied for each group, and all receivers within that group can be read simultaneously. This process can be repeated for all groups within that cycle. Then, the same process is repeated for the second cycle.

For the various embodiments taught herein, electrodes can be galvanic or capacitive. Capacitive electrodes have stable contact resistance and are less vulnerable to corrosion. Optimum frequency of operation of the various systems may range from DC to 100 KHz. Lower frequencies can be used with longer transmitter receiver spacing for deep sensitivity, and higher frequencies can be used with shorter transmitter receiver spacing for shallow sensitivity.

The optical fibers used in the various embodiments may be implemented as fiber optic cables. These fiber optic structures provide for communicating measured signal uphole for further processing. The potential difference to be measured is applied across the terminals of an electro-mechanical transducer as taught in the embodiments discussed above and in similar arrangements of bipoles with bucking electrodes. As the electro-mechanical transducer deforms due to the applied potential, it induces strain in the optical fiber bonded to it. A non-limiting example of an electro-mechanical transducer that may be used is lead zirconate titanate (PZT).

In another embodiment, a length of the optical fiber, between injection and return electrodes, can be coated in an electrostrictive material, for example, lead titanate doped lead magnesium niobate (PT:PMN). The electrostrictive material deforms due to the incident electric field, and induces strain in the optical fiber bonded to it. Fiber optic sensors can be packaged in electromagnetic compatible high pressure, high temperature packages that are connected to fiber optic tubing encapsulated cable (TEC), and clamped to the casing as it is being deployed. Examples of packaging materials include Inconel and BeCu.

Strain in the optical fiber can be interrogated at the surface using known fiber optic multiplexing and interrogation techniques. This obviates any need for multiplexing circuitry downhole. The system can be operated such that the strain is linearly proportional to the applied field. Signals from other receivers at different axial locations can be communicated over the same fiber optic cable. The difference axial locations are along the optical fiber that is disposed along a pipe structure in the wellbore. Signals from different receivers are discriminated at the surface using known fiber optic multiplexing and interrogation techniques. However, in another embodiment, not shown in the Figures, an electronic switching circuit can be used to multiplex signals from different sensors to an electric or fiber optic cable that delivers the signal uphole.

Casing centralizers, not shown in the Figures to focus on the arrangements of bipoles and associated bucking electrodes, can be used to preserve the spacing between the casing and the borehole and therefore can protects the receiver units and/or sensors from damage as the casing is deployed.

Also not shown in the figures is cement that holds a pipe structure in place in a wellbore. Cement resistivity can be adjusted to ensure maximum current conduction to the formation. As can be appreciated, too conductive cement will short out currents preventing any signal to be injected into the formation. On the other hand, too resistive cement will act as insulator and prevents current from reaching the formation. Ideally, cement resistivity should be in the same order of magnitude as that of formation. The resistivity of cement can be increased by mixing high resistivity additives with the cement slurry. These additives can be ceramic powder, epoxy resins, polyester resins, or any other high resistivity material that can be mixed with cement and at the same time does not affect its integrity after setting. As an option to increase the conductivity of cement in the production zone, high conductivity additives, such as carbon, can be added.

Figure 7:
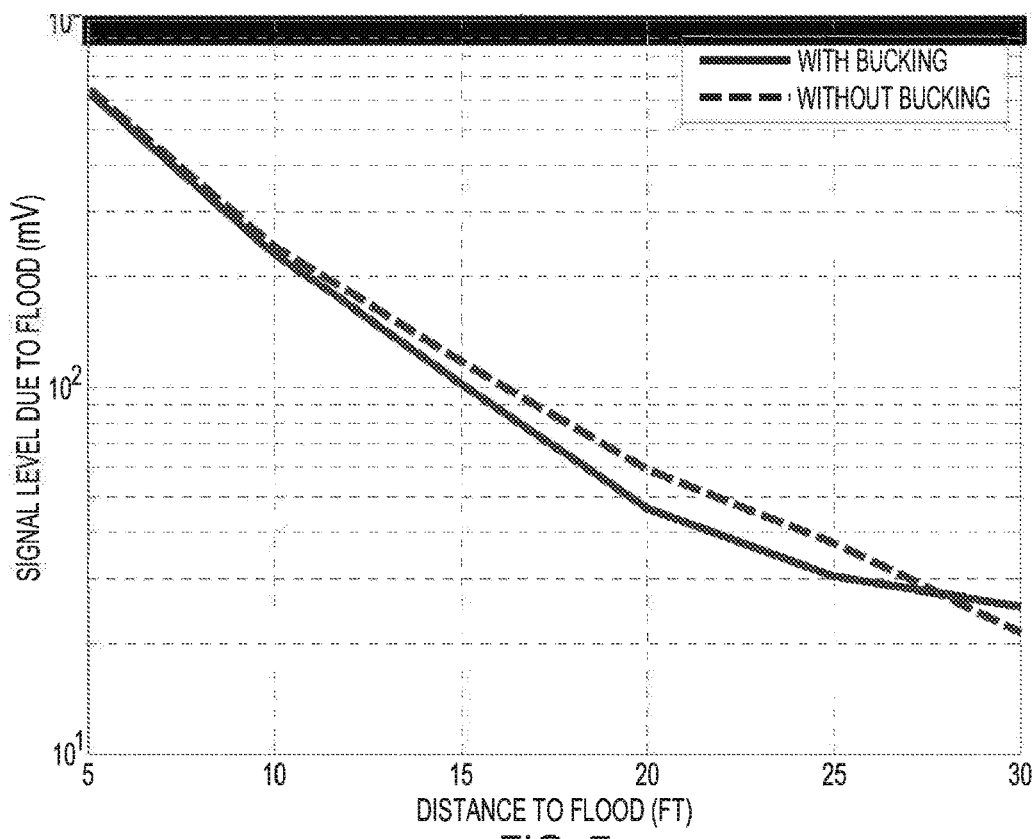
FIG. 7 is a plot of signal level due to waterflood versus distance to waterflood for an example model, in accordance with various embodiments.
Figure 8:
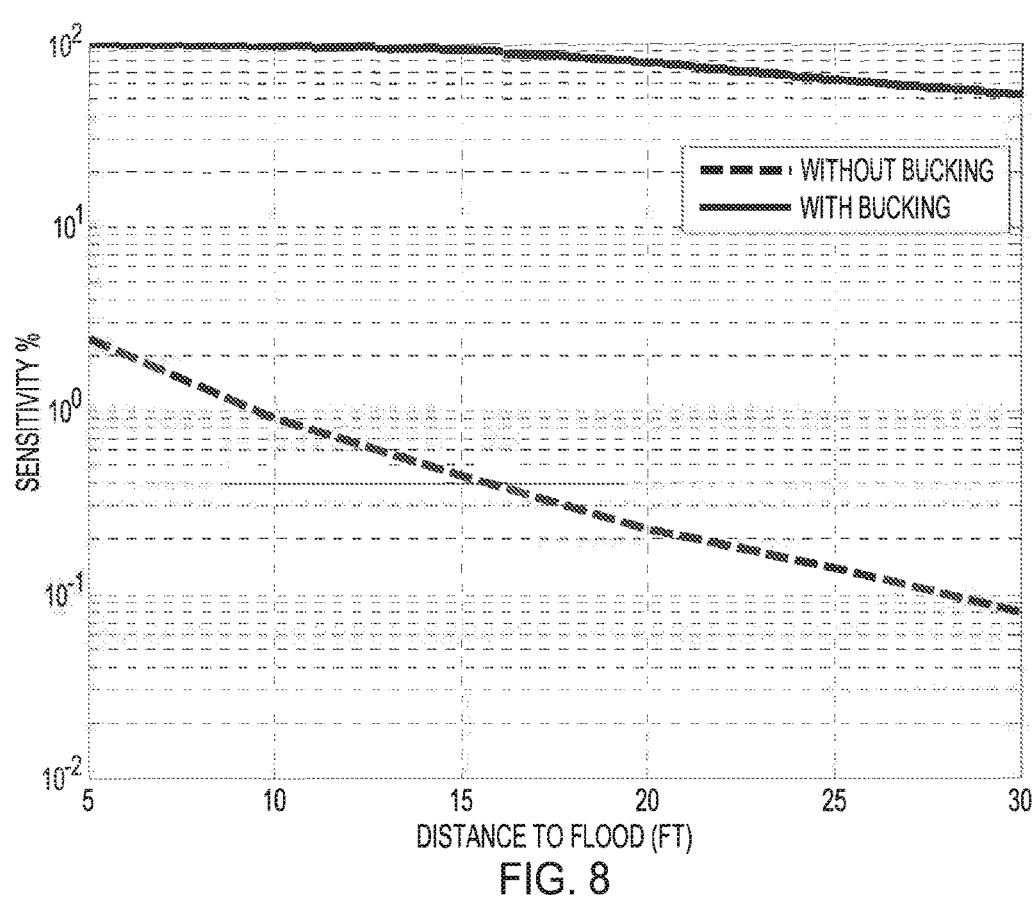
FIG. 8 is a plot of sensitivity versus distance to waterflood of the example model of FIG. 7, in accordance with various embodiments.

To demonstrate operation of bipoles with bucking electrodes as taught herein, simulation results are presented for the embodiment shown in FIG. 1A. The following model parameters were chosen for the simulation: an insulated casing with a 7"outer diameter (OD), three electrodes of 2 in length located at $z=-15$ ft, 15 ft and 16 ft, respectively, a formation resistivity equal to 10 Ohm·m, a waterflood resistivity equal to 1 Ohm·m, 50 ft thick, a current at a first electrode of $IA1=1$ A, and a current at a second electrode of $IA2=1.38$ A. The relationship given by $IA1+IA2+IA3=0$ was used in the model. FIG. 7 is a plot of signal level due to waterflood versus distance to waterflood for the example model. FIG. 8 is a plot of sensitivity versus distance to waterflood of the example model. The sensitivity is defined as the percentage of flood signal to the total received signal. Bucking is shown to improve the sensitivity without sacrificing signal level. FIG. 8 shows that bucking improves the sensitivity significantly without sacrificing the signal level.

Figure 9:
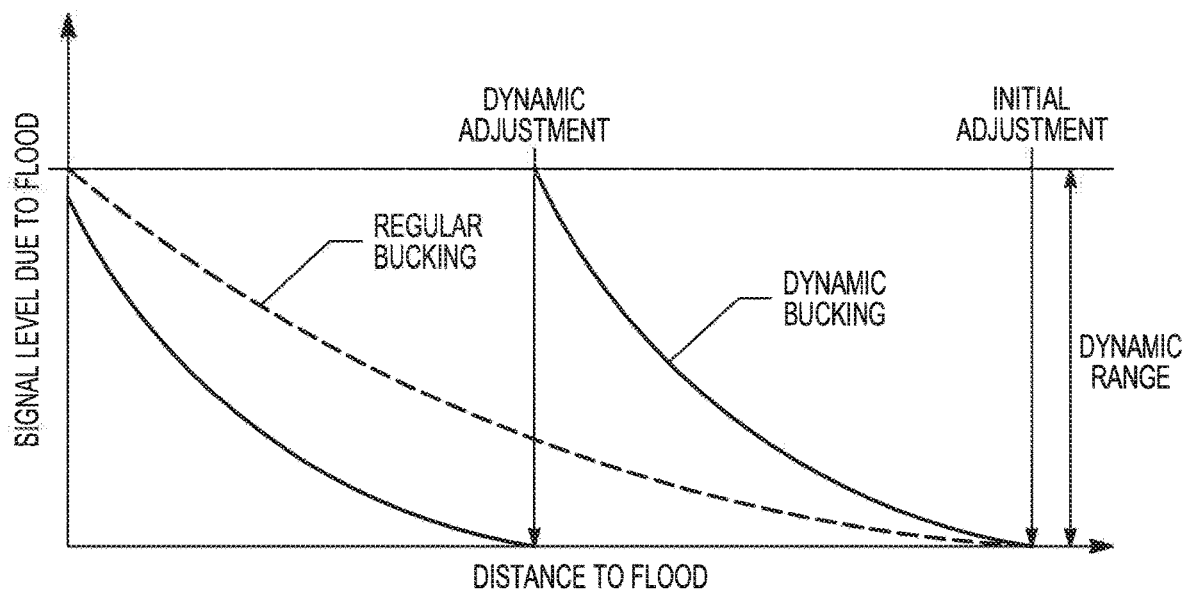
FIG. 9 is a plot of signal level due to waterflood versus distance to waterflood showing regular versus dynamic bucking, in accordance with various embodiments.

Bucking can be adjusted dynamically to enable dynamic range reuse, as illustrated in FIG. 9. FIG. 9 is a plot of signal level due to waterflood versus distance to waterflood showing regular versus dynamic bucking. In regular bucking, calibration is performed once in the absence of waterflood to compute the bucking currents required to cancel out the no flood signal. Bucking currents are then applied as the system monitors approaching waterflood. To prevent sensors from saturation as the waterflood gets closer, the transmitted signal level can be adjusted from the beginning so that the signal level due to waterflood as it hits the well lies within the dynamic range of the sensors. This sets a limit on the signal level that can be received from distant waterflood, and therefore sets a limit on the maximum range of detection.

With dynamic bucking, the transmitted signal level can be increased so that saturation can be reached at a point where the waterflood is still far from the well. When this point is reached, the bucking current can be adjusted to cancel out (or minimize) the flood signal. In this manner, the full dynamic range can be reused. Dynamic bucking enables increasing the signal to ratio of distant waterfloods and consequently increasing the range of detection. It also enables monitoring waterfloods with different shapes and/or contrasts without having to worry about signal saturation.

Figure 10:
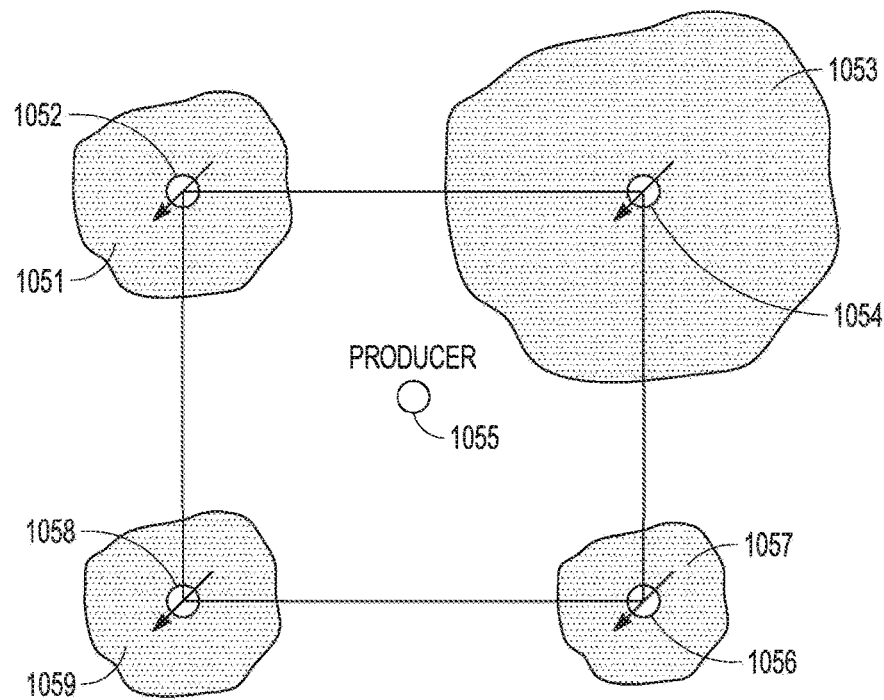
FIG. 10 is a schematic representation of a unit cell of a five-spot injection pattern for enhanced oil recovery, in accordance with various embodiments.

Another application of dynamic bucking is in monitoring waterflood injected form multiple injectors. FIG. 10 is a schematic representation of a unit cell of a five-spot injection pattern 1050 for enhanced oil recovery. A producer well 1055 is surrounded by four injectors 1052, 1054, 1056, and 1058 that produce waterfloods 1051, 1053, 1057, and 1059, respectively. Depending on the properties of the formation and injection rates, waterflood from different injectors approaches with different speeds. A permanent monitoring system can be deployed behind the casing in the producer well. Sensors may be saturated by the first-breaking flood front, impeding the detection of waterfloods from other injectors. Dynamic bucking can be used to cancel out (or minimize) the signal from the first-breaking flood front, allowing for the full dynamic range to be used to monitor waterfloods from other injectors.

Figure 11A:
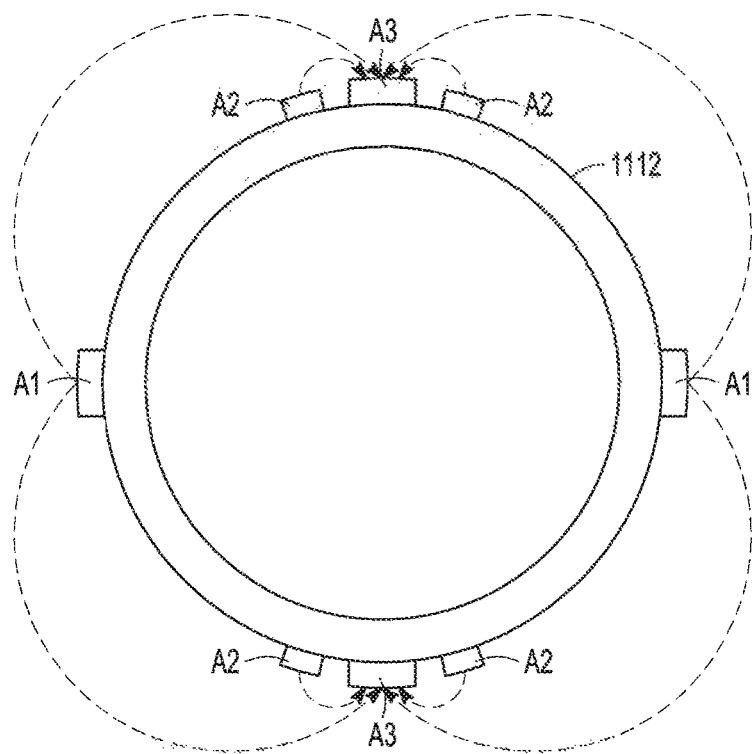
FIGS. 11A-11B are schematic representations of injection electrodes, return electrodes, and bucking electrodes on an insulated casing for azimuthal bucking, in accordance with various embodiments.
Figure 11B:
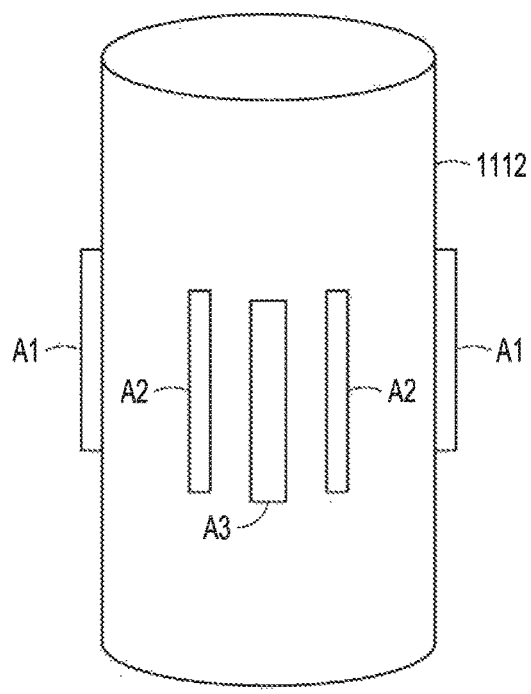

In various embodiments, electrodes can be disposed on a pipe azimuthally at the same axial position to achieve azimuthal sensitive measurements that can be used to determine the direction of the approaching waterflood. An axial position refers to position along a longitudinal axis of the pipe. FIGS. 11A-11B are schematic representation of injection electrodes A1, return electrodes A3, and bucking electrodes A2 on an insulated casing 1112. FIG. 11A is a top view of the electrodes A1, A2, and A3 on the insulated casing 1112 for azimuthal bucking. FIG. 11B is a side view of the electrodes A1, A2, and A3 on the insulated casing 1112 for azimuthal bucking.

Model-based inversion with respect to the arrangements of bipoles and bucking electrode can be executed to convert a signal from bucked measurements to waterflood distance and resistivity. Model-based inversion aims at finding an optimum waterflood distance and resistivity that minimizes misfit between bucked measurements and synthetic data generated using a computer model that simulates casing-mounted bipoles in the formation. The resistivity of the formation can be assumed to be known as prior information from open-hole logs generated before casing the well. Bucked measurements can either be voltage measurements in baseline bucking embodiments or current measurements in continuous bucking embodiments.

Figure 12:
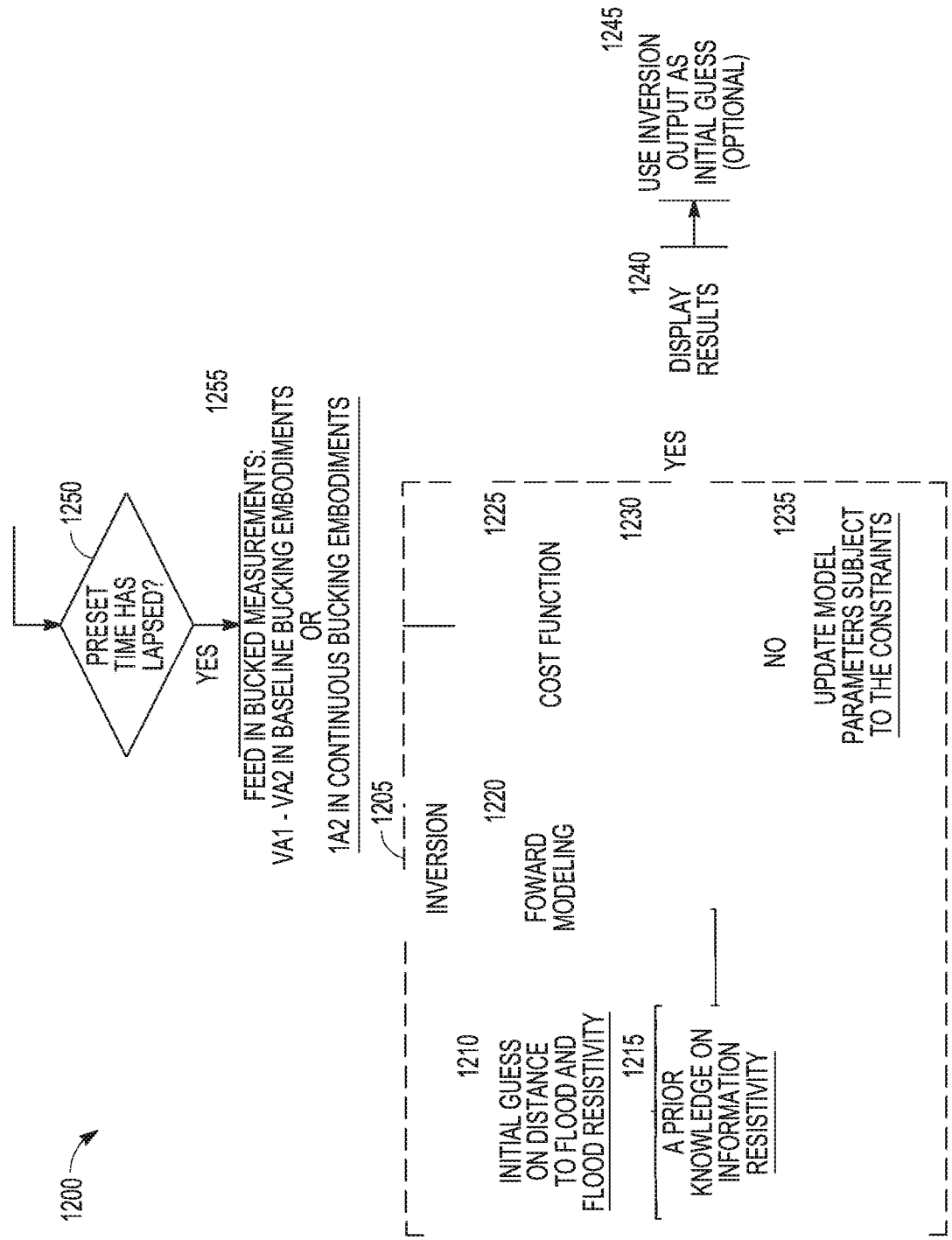
FIG. 12 is an example workflow for time-lapse inversion of bucked bipole measurements for waterflood monitoring, in accordance with various embodiments.

FIG. 12 is an example of an embodiment of a workflow 1200 for time-lapse inversion of bucked bipole measurements for waterflood monitoring. An inversion procedure 1205 that combines forward modeling with a cost function can be implemented. At 1210, an initial guess on distance to waterflood and flood resistivity is generated. At 1215, a priori knowledge of formation resistivity is acquired. This acquisition may be conducted with respect to previously measurements, whose results are stored in some type of memory structure such as a database. At 1220, forward modeling is conducted from inputs from generating an initial guess and acquiring a priori knowledge of formation resistivity.

At 1225, a cost function is analyzed with inputs from the forward modeling from 1220 and from bucked measurements. A cost function, also referred to as a parametric function, can be formed from a linear combination of a misfit function and a stabilizing function. A stabilizing function is also known as a regularization term. The misfit functional can be formed as the L2 norm of the weighted difference between observed (measured) data and predicted (synthetically computed from the model) data. The stabilizing functional can be formed as a L0.5, L1, or L2 norm of weighted model parameters, and may be inclusive of a priori models and spatial functions.

Model parameters can be iteratively adjusted, subject to preset constraints, to minimize the parametric functional. Constraints can be used to ensure that model parameters output from the inversion process lie within their physical ranges. In each iteration of the minimization process, convergence is checked at 1230. The convergence can be checked through pre-defined termination criteria. These criteria may include, but are not limited to, one or more of the following: (a) cost function is less than a specified tolerance; (b) change in model parameters is less than a specified tolerance; (c) change in the cost function is less than a specified tolerance; (d) magnitude of search direction is smaller than a specified tolerance; and (e) number of iterations exceeded a specified maximum.

At 1235, if the convergence criterion is not met, the model parameters can be updated subject to the constraints. The updated model parameters can be provided as input to forward modeling at 1220 for another execution of forward modeling. At 1240, if the convergence is met, the results of the process can be displayed, where the results may include the distance to the flood front. At 1245, inversion results output can optionally be used as a new initial guess that is input to the forward modeling 120.

At 1250, a determination is made as to whether a preset has lapsed. This determination can be made to initial another evaluation of the current distance to the flood front. If the preset time has elapsed, bucked measurements can be feed to the cost function at 1225 to be evaluated with the forward modeling output in the iterative process of the inversion 1205. The bucked measurements can be based on VA1−VA2 in baseline bucking measurements or IA2 in continuous bucking measurements.

Numerical techniques to achieve minimization in workflow 1200 may include deterministic methods and/or stochastic methods. Such deterministic methods can include, for example, Gauss-Newton, Trust-Region-Reflective, Levenverg-Marquardt, Steepest Descent, Conjugate Gradients, or other deterministic method. Such stochastic methods can include, for example, Markov Chain, Monte Carlo, Genetic Algorithms, Simulated Annealing, or other stochastic method. In addition to a final model, the inversion may generate inversion metrics such as misfit/error, data uncertainty estimates, and model uncertainty estimates.

Figure 13:
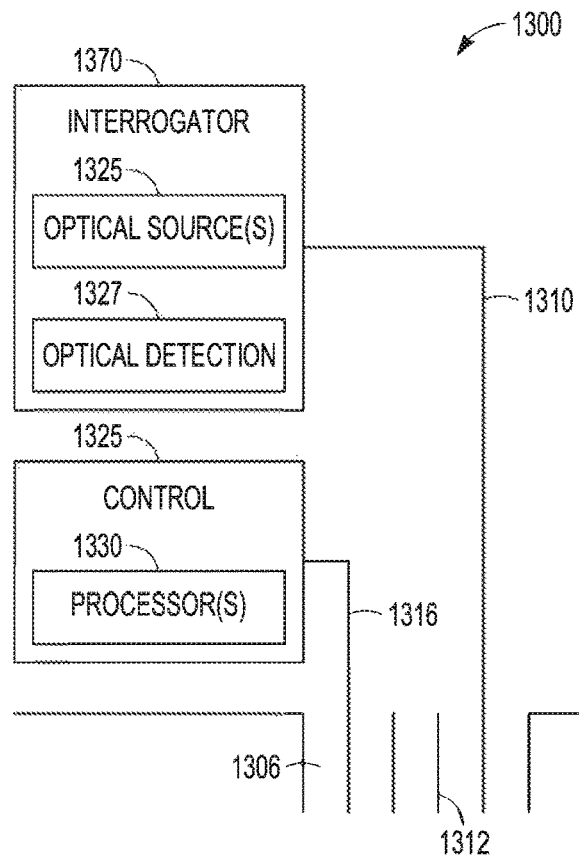
FIG. 13 is a schematic representation of instrumentation to operate arrangements of electrodes and optical fiber to monitor detection of a flood front of a waterflood in a formation, in accordance with various embodiments.

FIG. 13 is a schematic representation of instrumentation 1300 to operate arrangements of electrodes and optical fiber to monitor detection of a flood front of a waterflood in a formation 604. The instrumentation 1300 can be used with arrangements of bipole/bucking as taught herein. The instrumentation 1300 can include control 1325 and interrogator 1370. The control 1325 can include a set of processors 1330 that control current on a set of power lines 1316 to bipole/bucking arrangements coupled to a pipe structure 1312 in wellbore 1306. The set of processors 1330 can used to analysis data generated by the interrogator 1370. The set of processors 1330 can be realized as one or more processors.

The interrogator 1370 can include optical sources 1325 and optical detection 1327 to interrogate an optical fiber deployed along the pipe structure 1312 in the wellbore 1306 via an optical connector 1310. The optical connector 1310 can be realized as any optical structure to connect to an optical fiber for propagation of an optical signal into and back from the optical fiber. The optical connector 1310 may be a portion of the optical fiber that extends outside the wellbore 1306. The optical sources 1325 can be one or more lasers and the optical detection 1327 can include optical detectors, optical coupling elements, interferometric systems, and other optical components to generate optical signals in the optical fiber and examine returned optical signals.

The set of processors 1330 can be structured to control operation and/or analysis of any arrangements similar or identical to arrangements as taught with respect to FIGS. 1A, 1B, 4A-6B, and 9-11B. The set of processors 1330 can be arranged to control injection of current by electrodes of a set of three current electrodes for a number of sets of current electrodes, to control interrogation of the optical fiber of the various arrangements over time, and to determine progression of waterflood with respect to the wellbore. The set of processors 1330 can be arranged to adjust current in the a power line to make simultaneous measurements using a number of sets of electrodes, and corresponding electro-optic transducers for each set, for example, in the arrangements 500-A and 500-B. The set of processors 1330 can be arranged to control current to and from three current electrodes of a set for a number of sets in a dual cycle scheme in which, in a first cycle, a main current is operatively injected in the formation from a first power line and a bucking current is operatively injected in the formation from a second power line, and, in a second cycle, a main current is operatively injected in the formation from the first power line and a bucking current is operatively injected in the formation from a third power line, for example, as conducted in a dual cycle scheme using arrangement 600.

The set of processors 1330 can be arranged to excite the three current electrodes in the set simultaneously with multiple frequencies. With one of the electrodes arranged as a return, excitation of the other two electrodes effectively provides excitation to the return electrode. The set of processors 1330 can be arranged to control injection of current and interrogation of the optical fiber over time of various arrangements such that control includes control of operations to: set a main current in the formation from one of three current electrodes of a set; adjust a bucking current in the formation from the one of the other two current electrodes in the set of three current electrodes such that a voltage difference between two monitor electrodes coupled to an electro-optic transducer is zero at a given baseline time where the waterflood is far away from the borehole; and measure the voltage difference between the two monitor electrodes coupled to the electro-optic transducer as the waterflood approaches the wellbore. The set of processors 1330 can be arranged to control injection of current and interrogation of the optical fiber over time of various arrangements such that control includes control of operations to: set a main current in the formation from one of three current electrodes; adjust a bucking current in the formation from one of the other two current electrodes of the set such that a voltage difference between two monitor electrodes coupled to the electro-optic transducer is zero; and measure the adjusted bucking current as the waterflood approaches the wellbore.

The set of processors 1330 can be arranged to control operations to: monitor a signal level due to the waterflood to determine a point at which the signal level reaches saturation; and adjust a bucking current from one of two current electrodes of three current electrode electrodes such that a signal level due to the waterflood is reduced to a minimal level at the point at which the signal level reaches saturation. The set of processors 1330 can be arranged to control operations to monitor progression of waterflood to a wellbore from a plurality of injector wells.

The set of processors 1330 can be arranged to determine flood distance and resistivity that minimizes misfit between bucked measurements, generated by use of control of current in a set of three current electrodes and interrogation of the optical fiber over time, and synthetic data generated by use of a model that includes simulation of operation of the set of three current electrodes in the formation. The bucked measurements can include voltage measurements from a baseline bucking scheme or current measurements from a continuous bucking scheme.

Figure 14:
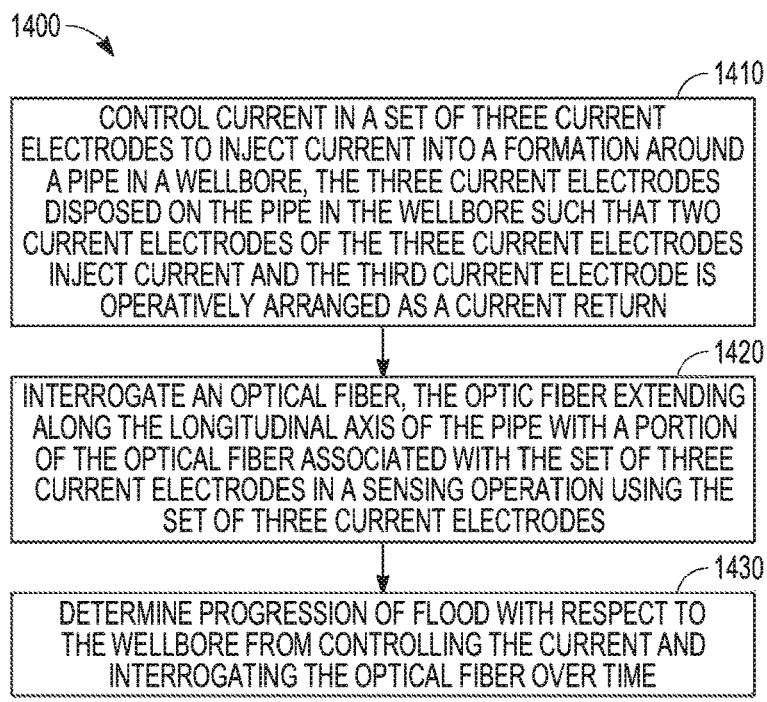
FIG. 14 is a flow diagram of features of an example method to monitor detection of a waterflood front of a waterflood in a formation, in accordance with various embodiments.

FIG. 14 is a flow diagram of features of an embodiment of an example method to monitor detection of a waterflood front of a waterflood in a formation. At 1410, current in a set of three current electrodes is controlled to inject current into a formation around a pipe in a wellbore, the three current electrodes disposed on the pipe in the wellbore such that two current electrodes of the three current electrodes inject current and the third current electrode is operatively arranged as a current return. The three current electrodes are associated with a set of two monitor electrodes, the two monitor electrodes being two current electrodes of the set of three current electrodes or two electrodes different from the set of three current electrodes. Controlling current in the set of three current electrodes can include using three separate power lines coupled to the set of three current electrodes from the surface, each power line coupled to a respective one of the three current electrodes. Alternatively, controlling current in the set of three current electrodes can include using a single power line and a return coupled to downhole electronics from the surface, the downhole electronics operable to control currents to and from the formation from the three current electrodes. Controlling current in the set of three current electrodes can include exciting the three current electrodes in the set of three current electrodes simultaneously with multiple frequencies.

Controlling the current in a set of three current electrodes can include: monitoring a signal level due to the waterflood to determine a point at which the signal level reaches saturation; and adjusting a bucking current from one of the three current electrodes such that a signal level due to the waterflood is reduced to a minimal level at the point at which the signal level reaches saturation.

Controlling current in the set of three current electrodes can include controlling current in a plurality of sets of three current electrodes with the current electrodes of the sets of three current electrodes disposed on the pipe at different azimuthal positions at substantially a same axial position along the longitudinal axis of the pipe to determine direction of the waterflood as the waterflood progresses.

At 1420, an optical fiber is interrogated, the optical fiber extending along the longitudinal axis of the pipe with a portion of the optical fiber associated with the set of three current electrodes in a sensing operation using the set of three current electrodes. Interrogating the optical fiber can include interrogating the portion of the optical fiber with the portion of the optical fiber coated with an electrostrictive material over a length of the optical fiber between the injection and return current electrodes of the set of three current electrodes. Interrogating the optical fiber can include interrogating the portion of the optical fiber with the portion of the optical fiber coupled to an electro-optic transducer disposed along the pipe, the electro-optic transducer coupled to the two monitor electrodes.

With respect to method including a set of three current electrodes and an electro-optic transducer coupled to two monitor electrodes, controlling the current and interrogating the optical fiber over time can include: setting a main current in the formation from one of the three current electrodes; adjusting a bucking current in the formation from the one of the other two current electrodes in the set of three current electrodes such that a voltage difference between the two monitor electrodes coupled to the electro-optic transducer is zero at a given baseline time where the waterflood is far away from the borehole; and measuring the voltage difference between the two monitor electrodes coupled to the electro-optic transducer as the waterflood approaches the wellbore.

With respect to method including a set of three current electrodes and an electro-optic transducer coupled to two monitor electrodes, controlling the current and interrogating the optical fiber over time can include: setting a main current in the formation from one of the three current electrodes; adjusting a bucking current in the formation from the one of the other two current electrodes in the set of three current electrodes such that a voltage difference between the two monitor electrodes coupled to the electro-optic transducer is zero; and measuring the adjusted bucking current as the waterflood approaches the wellbore.

At 1430, progression of waterflood is determined with respect to the wellbore from controlling the current and interrogating the optical fiber over time. In an embodiment, progression of waterflood to the wellbore from a plurality of injector wells is monitored.

Variations of method 1400 or methods similar to method 1400 can include a number of different embodiments that may or may not be combined depending on the application of such methods and/or the architecture of systems in which such methods are implemented. Such methods can include, with interrogating the optical fiber including interrogating the portion of the optical fiber with the portion of the optical fiber coupled to an electro-optic transducer disposed along the pipe and with the electro-optic transducer coupled to the two monitor electrodes, controlling current in one or more additional sets of three current electrodes disposed along a longitudinal axis of the pipe using a first, a second, and a third power line from the surface, each additional set of three current electrodes associated with an additional set of two monitor electrodes, the two monitor electrodes of each additional set of two monitor electrodes being two current electrodes of the associated set of three current electrodes or two electrodes different from the associated additional set of three current electrodes, the two monitor electrodes of each additional set of two monitor electrodes tied to an individual electro-optic transducer of a set of electro-optic transducers coupled to the optical fiber, each set of three current electrodes sharing one of its three current electrodes with another set of three current electrodes, a first current electrode of the three current electrodes of each set of three current electrodes coupled to the first power line providing a main current from the respective set to the formation, a second current electrode of the three current electrodes of each set of three current electrodes coupled to the second power line providing a bucking current from the respective set of three current electrodes to the formation, a third current electrode of the three current electrodes of each set of three current electrodes coupled to the third power line providing a return; and adjusting the current in the second power line to make simultaneous measurements using the set of three current electrodes and the additional sets of three current electrodes.

Variations of method 1400 or methods similar to method 1400 can include, with interrogating the optical fiber including interrogating the portion of the optical fiber with the portion of the optical fiber coupled to an electro-optic transducer disposed along the pipe and with the electro-optic transducer coupled to the two monitor electrodes, controlling current in one or more additional sets of three current electrodes disposed along the pipe using a first, a second, and a third power line from the surface, each current electrode of the three current electrodes of each set coupled to a different one power line of the three power lines, each additional set of three current electrodes associated with an additional set of two monitor electrodes, the two monitor electrodes of each additional set of two monitor electrodes being two current electrodes of the associated set of three current electrodes or two electrodes different from the associated additional set of three current electrodes, the two monitor electrodes of each additional set of two monitor electrodes tied to an individual electro-optic transducer of a set of electro-optic transducers coupled to the optical fiber, each set of three current electrodes sharing two of its three current electrodes with another set of three current electrodes; and operating the control of the current in a dual cycle scheme in which, in a first cycle, a main current is injected in the formation using the first power line and a bucking current is injected in the formation using the second power line, and, in a second cycle, a main current is injected in the formation using the first power line and a bucking current is injected in the formation using the third power line.

Variations of method 1400 or methods similar to method 1400 can include operating a processor to determine waterflood distance and resistivity that minimizes misfit between bucked measurements and synthetic data, the synthetic data generated using a model that includes simulation of operation of the set of three current electrodes in the formation, the bucked measurements generated using the controlling of the current of the set of three current electrodes and interrogating the optical fiber over time. The bucked measurements can include voltage measurements using a baseline bucking scheme or current measurements using a continuous bucking scheme.

In various embodiments, a non-transitory machine-readable storage device can comprise instructions stored thereon, which, when performed by a machine, cause the machine to perform operations, the operations comprising one or more features similar to or identical to features of methods and techniques described with respect to method 200, method 300, method 1200, method 100, variations thereof, and/or features of other methods taught herein such as associated with FIGS. 1-15. The physical structures of such instructions may be operated on by one or more processors. For example, executing these physical structures can cause the machine to perform operations comprising: controlling current in a set of three current electrodes to inject current into a formation around a pipe in a wellbore, the three current electrodes disposed on the pipe in the wellbore such that two current electrodes of the three current electrodes inject current and the third current electrode is operatively arranged as a current return, the three current electrodes associated with a set of two monitor electrodes, the two monitor electrodes being two current electrodes of the set of three current electrodes or two electrodes different from the set of three current electrodes; interrogating an optical fiber, the optical fiber extending along the longitudinal axis of the pipe with a portion of the optical fiber associated with the set of three current electrodes in a sensing operation using the set of three current electrodes; and determining progression of waterflood with respect to the wellbore from controlling the current and interrogating the optical fiber over time.

Execution of various instructions may be realized by the control circuitry of the machine to execute one or more features similar to or identical to features of methods and techniques described with respect to method 200, method 300, method 1200, method 1400, variations thereof, and/or features of other methods taught herein such as associated with FIGS. 1-15. For example, the instructions can include instructions to operate a tool or tools having an interrogator disposed with respect to an optical fiber in a wellbore to provide data to process in accordance with the teachings herein.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory 1535 of FIG. 15. While memory 1535 is shown as a single unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 15:
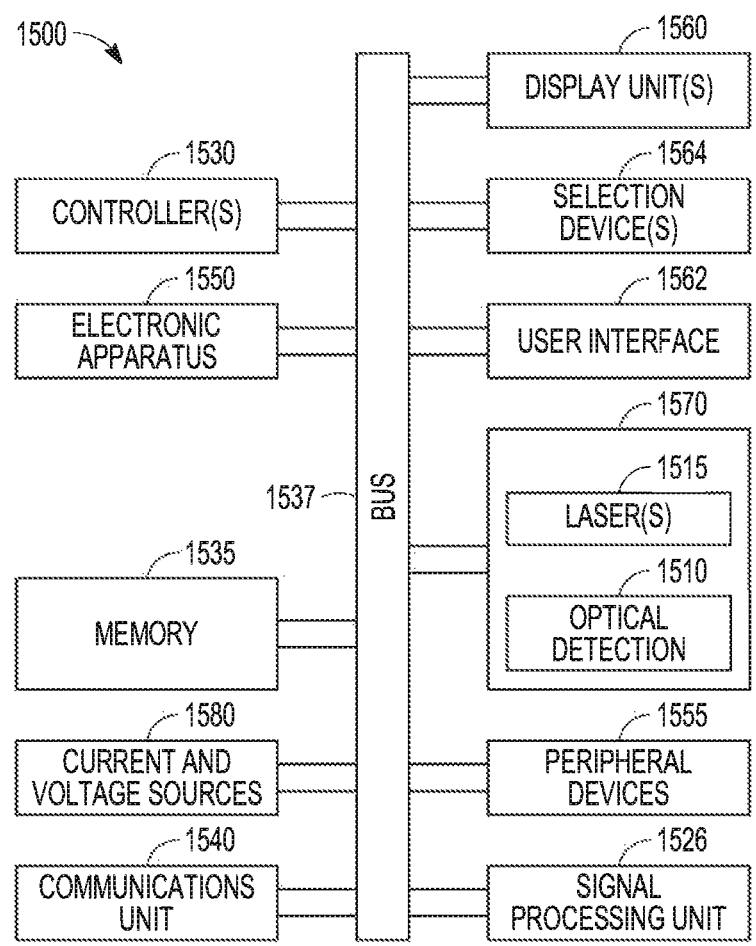
FIG. 15 is a block diagram of features of an example system operable to execute schemes associated with arrangements of electrodes and optical fiber to monitor detection of a flood front of a waterflood in a formation, in accordance with various embodiments.

FIG. 15 is a block diagram of features of an embodiment of an example system 1500 operable to execute schemes associated with arrangements of electrodes and optical fiber to monitor detection of a flood front of a waterflood in a formation. The system 1500 can comprise instrumentality as taught herein, or similar arrangements and their operation as taught herein.

The system 1500 can comprise a controller or controllers 1530 and an interrogator 1570, where the interrogator 1570 includes one or more lasers 1515 and optical detection 1510. The controller(s) 1530 can be arranged to control the one or more lasers 1515 and the optical detection 1510. The controller(s) 1530 can be arranged to process data from optical signals received by the interrogator 1570, where the optical signals are from regions of the wellbore, in response to optical signals coupled into an optical fiber by the laser(s) 1515 with the optical fiber disposed in the wellbore generated to determine status of a flood front of a waterflood in a formation. The controller(s) 1530 can be operable to process optical signals in accordance with features similar to or identical to features of methods and techniques described with respect to method 200, method 300, method 1200, method 1400, variations thereof, and/or features of other methods taught herein such as associated with FIGS. 1-14. The controller(s) 1530 can be realized as one or more processors. The controller(s) 1530 can be arranged as a single processor or a group of processors. Processors of the group of processors may operate independently depending on an assigned function. The controller(s) 1530 can be realized as one or more application-specific integrated circuits (ASICs). The controller(s) 1530 can be realized as control circuitry to manage the components of system 1500.

The optical detection 1510 can be realized by different optical sensors and/or optical processing devices. For example, the optical detection 1510 can include one of more interferometric systems. The laser(s) 1515 can include one or more lasers. The one or more lasers may be operable at selected laser frequencies.

The system 1500 can include a user interface 1562 operable with the controller(s) 1530, a signal processing unit 1526 operable with the user interface 1562, where the controller(s) 1530, the user interface 1562, and the signal processing unit 1526 can be structured to be operated according to any scheme similar to or identical to the schemes associated with monitoring detection of a flood front of a waterflood in a formation as taught herein. The system 1500 can be arranged as a distributed system.

The system 1500 can include a memory 1535, an electronic apparatus 1550, and a communications unit 1540. The controller(s) 1530, the memory 1535, and the communications unit 1540 can be arranged to operate as a signal processing unit to control investigation of a flood front of a waterflood in a formation. The memory 1535 can be realized as a memory module, which may include a set of memory devices and access devices to interface with the set of memory devices. The memory 1535 can include a database having information and other data such that the system 1500 can operate on data to control the laser(s) 1515 and the optical detection 1510. In an embodiment, the signal processing unit 1526 can be distributed among the components of the system 1500 including memory 1535 and/or the electronic apparatus 1550. Alternatively, the signal processing unit 1526 can be arranged as an independent system having its own processor(s) and memory. The electronic apparatus 1550 can include drivers to provide voltage and/or current input to components of the system 1500 using current and voltage sources 1580. For example, the electronic apparatus 1550 can include drivers of optical sources, such as lasers and can include electronic circuitry for optical detectors and interferometric devices associated with optical fiber receiver arrangements.

The communications unit 1540 may use combinations of wired communication technologies and wireless technologies at appropriate frequencies. The communications unit 1540 can allow for a portion or all of data analysis regarding the status of detection of a flood front of a waterflood in a formation around the pipes to be provided to the user interface 1562 for presentation on the one or more display unit(s) 1560 aboveground. The communications unit 1540 can allow for transmission of commands to downhole components in response to signals provided by a user through the user interface 1562.

The system 1500 can also include a bus 1537, where the bus 1537 provides electrical conductivity among the components of the system 1500. The bus 1537 can include an address bus, a data bus, and a control bus, each independently configured. The bus 1537 can be realized using a number of different communication mediums that allows for the distribution of components of the system 1500. Use of the bus 1537 can be regulated by the controller(s) 1530. The bus 1537 can include a communications network to transmit and receive signals including data signals and command and control signals. In a distributed architecture, the bus 1537 may be part of a communications network.

In various embodiments, peripheral devices 1555 can include additional storage memory and/or other control devices that may operate in conjunction with the controllers(s) 1530 and/or the memory 1535. The display unit(s) 1560 can be arranged with a screen display as a distributed component that can be used with instructions stored in the memory 1535 to implement the user interface 1562 to manage the operation of the interrogator and/or components distributed within the system 1500. Such a user interface can be operated in conjunction with the communications unit 1540 and the bus 1537. The display unit(s) 1560 can include a video screen, a printing device, or other structure to visually project data/information and images. The system 1500 can include a number of selection devices 1564 operable with the user interface 1562 to provide user inputs to operate the signal processing unit 1526 or its equivalent. The selection device(s) 1564 can include one or more of a touch screen, a computer mouse, or other control device operable with the user interface 1562 to provide user inputs to operate the signal processing unit 1526 or other components of the system 1500.

Systems and methods as taught herein can provide improved dynamic range necessary for detecting fingering and low contrast waterfloods, as well as deep detection (50+ ft). Such systems and methods can provide dynamic bucking that enables dynamic range reuse to detect waterfloods with a variety of shapes and across a wide span of detection ranges. The detection of waterfloods and their progression can be used to optimize oil production. In various embodiments, received signals can be communicated uphole using fiber optic methods, obviating the need for active electronic components and circuits to be deployed downhole. Systems and methods as taught herein also can allow for integration and operation with other fiber optic-based sensor systems, for example, distributed acoustic sensing, and distributed temperature sensing. Such systems can be simultaneously deployed with other fiber optic-based sensor systems, including but not limited to fiber optic-based acoustic, temperature, pressure, strain, chemical, current, or electric field sensors or combinations thereof. Such systems and methods can be integrated with intelligent well completions to minimize water production.

In various embodiments, systems and methods can be implemented for permanently installing and operating a measurement system for reservoir monitoring. Systems and methods as taught herein can be used to monitor waterflood due to natural coning or enhanced oil recovery (EOR). The systems and methods can be operated in the presence of any formation fluid. Bipole transmitters and receivers in the arrangements taught herein can be realized by low power bipole transmitters and receivers that can satisfy the limited power consumptions described in various well-related electrical standards, for example Intelligent Well Interface Standardization (IWIS). This is particularly important for offshore wells where power from the subsea power module is limited. Systems as taught herein can be deployed along the casing of a single well, or along the casings of multiple wells, for example, for crosswell EM tomography, or along a surface, for example, for borehole-to-surface EM tomography. Such systems and methods can improve data quality, and enable higher sensitivity for waterflood movement within a reservoir. Further, such systems and methods can have direct relevance to the monitoring of one or more of oil, gas, $CO_2$, water production, or water injection. The systems as taught herein can be deployed on casing in onshore or offshore wells that are either vertical, high angle, or horizontal.

The following are example embodiments of methods, machine readable storage devices, and systems, in accordance with the teachings herein.

A method 1 can comprise: controlling current in a set of three current electrodes to inject current into a formation around a pipe in a wellbore, the three current electrodes disposed on the pipe in the wellbore such that two current electrodes of the three current electrodes inject current and the third current electrode is operatively arranged as a current return, the three current electrodes associated with a set of two monitor electrodes, the two monitor electrodes being two current electrodes of the set of three current electrodes or two electrodes different from the set of three current electrodes; interrogating an optical fiber, the optical fiber extending along the longitudinal axis of the pipe with a portion of the optical fiber associated with the set of three current electrodes in a sensing operation using the set of three current electrodes; and determining progression of waterflood with respect to the wellbore from controlling the current and interrogating the optical fiber over time.

A method 2 can include elements of method 1 and can include controlling current in the set of three current electrodes to include using three separate power lines coupled to the set of three current electrodes from the surface, each power line coupled to a respective one of the three current electrodes.

A method 3 can include elements of methods 1 and 2 and can include controlling current in the set of three current electrodes to include using a single power line and a return coupled to downhole electronics from the surface, the downhole electronics operable to control currents to and from the formation from the three current electrodes.

A method 4 can include elements of any of methods 1-3 and can include controlling current in the set of three current electrodes to include exciting the three current electrodes in the set of three current electrodes simultaneously with multiple frequencies.

A method 5 can include elements of any of methods 1-4 and can include interrogating the optical fiber to include interrogating the portion of the optical fiber with the portion of the optical fiber coated with an electrostrictive material over a length of the optical fiber between the injection and return current electrodes of the set of three current electrodes.

A method 6 can include elements of any of methods 1-5 and can include interrogating the optical fiber to include interrogating the portion of the optical fiber with the portion of the optical fiber coupled to an electro-optic transducer disposed along the pipe, the electro-optic transducer coupled to the two monitor electrodes.

A method 7 can include elements of method 6 and elements of any of methods 1-5 and can include controlling the current and interrogating the optical fiber over time to include: setting a main current in the formation from one of the three current electrodes; adjusting a bucking current in the formation from the one of the other two current electrodes in the set of three current electrodes such that a voltage difference between the two monitor electrodes coupled to the electro-optic transducer is zero at a given baseline time where the waterflood is far away from the borehole; and measuring the voltage difference between the two monitor electrodes coupled to the electro-optic transducer as the waterflood approaches the wellbore.

A method 8 can include elements of method 6 and elements of any of methods 1-5 and 7 and can include setting a main current in the formation from one of the three current electrodes; adjusting a bucking current in the formation from the one of the other two current electrodes in the set of three current electrodes such that a voltage difference between the two monitor electrodes coupled to the electro-optic transducer is zero; and measuring the adjusted bucking current as the waterflood approaches the wellbore.

A method 9 can include elements of method 6 and elements of any of methods 1-5, 7, and 8 and can include controlling current in one or more additional sets of three current electrodes disposed along a longitudinal axis of the pipe using a first, a second, and a third power line from the surface, each additional set of three current electrodes associated with an additional set of two monitor electrodes, the two monitor electrodes of each additional set of two monitor electrodes being two current electrodes of the associated set of three current electrodes or two electrodes different from the associated additional set of three current electrodes, the two monitor electrodes of each additional set of two monitor electrodes tied to an individual electro-optic transducer of a set of electro-optic transducers coupled to the optical fiber, each set of three current electrodes sharing one of its three current electrodes with another set of three current electrodes, a first current electrode of the three current electrodes of each set of three current electrodes coupled to the first power line providing a main current from the respective set to the formation, a second current electrode of the three current electrodes of each set of three current electrodes coupled to the second power line providing a bucking current from the respective set of three current electrodes to the formation, a third current electrode of the three current electrodes of each set of three current electrodes coupled to the third power line providing a return; and adjusting the current in the second power line to make simultaneous measurements using the set of three current electrodes and the additional sets of three current electrodes.

A method 10 can include elements of method 6 and elements of any of methods 1-5, and 7-9 and can include controlling current in one or more additional sets of three current electrodes disposed along the pipe using a first, a second, and a third power line from the surface, each current electrode of the three current electrodes of each set coupled to a different one power line of the three power lines, each additional set of three current electrodes associated with an additional set of two monitor electrodes, the two monitor electrodes of each additional set of two monitor electrodes being two current electrodes of the associated set of three current electrodes or two electrodes different from the associated additional set of three current electrodes, the two monitor electrodes of each additional set of two monitor electrodes tied to an individual electro-optic transducer of a set of electro-optic transducers coupled to the optical fiber, each set of three current electrodes sharing two of its three current electrodes with another set of three current electrodes; operating the control of the current in a dual cycle scheme in which, in a first cycle, a main current is injected in the formation using the first power line and a bucking current is injected in the formation using the second power line, and, in a second cycle, a main current is injected in the formation using the first power line and a bucking current is injected in the formation using the third power line.

A method 11 can include elements of any of methods 1-10 and can include the current to include: monitoring a signal level due to the waterflood to determine a point at which the signal level reaches saturation; and adjusting a bucking current from one of the three current electrodes such that a signal level due to the waterflood is reduced to a minimal level at the point at which the signal level reaches saturation.

A method 12 can include elements of any of methods 1-11 and can include monitoring progression of waterflood to the wellbore from a plurality of injector wells.

A method 13 can include elements of any of methods 1-14 and can include controlling current in the set of three current electrodes to include controlling current in a plurality of sets of three current electrodes with the current electrodes of the sets of three current electrodes disposed on the pipe at different azimuthal positions at substantially a same axial position along the longitudinal axis of the pipe to determine direction of the waterflood as the waterflood progresses.

A method 14 can include elements of any of methods 1-13 and can include operating a processor to determine waterflood distance and resistivity that minimizes misfit between bucked measurements and synthetic data, the synthetic data generated using a model that includes simulation of operation of the set of three current electrodes in the formation, the bucked measurements generated using the controlling of the current of the set of three current electrodes and interrogating the optical fiber over time.

A method 15 can include elements of method 14 and elements of any of methods 1-13 and can include the bucked measurements to include voltage measurements using a baseline bucking scheme or current measurements using a continuous bucking scheme.

A machine-readable storage device 1 can have instructions stored thereon, which, when executed by one or more processors of a machine, cause the machine to perform operations, where the operations can comprise: controlling current in a set of three current electrodes to inject current into a formation around a pipe in a wellbore, the three current electrodes disposed on the pipe in the wellbore such that two current electrodes of the three current electrodes inject current and the third current electrode is operatively arranged as a current return, the three current electrodes associated with a set of two monitor electrodes, the two monitor electrodes being two current electrodes of the set of three current electrodes or two electrodes different from the set of three current electrodes; interrogating an optical fiber, the optical fiber extending along the longitudinal axis of the pipe with a portion of the optical fiber associated with the set of three current electrodes in a sensing operation using the set of three current electrodes; and determining progression of waterflood with respect to the wellbore from controlling the current and interrogating the optical fiber over time.

A machine-readable storage device 2 can include elements of method 1 and can include controlling current in the set of three current electrodes to include using three separate power lines coupled to the set of three current electrodes from the surface, each power line coupled to a respective one of the three current electrodes.

A machine-readable storage device 3 can include elements of machine-readable storage devices 1 and 2 and can include controlling current in the set of three current electrodes to include using a single power line and a return coupled to downhole electronics from the surface, the downhole electronics operable to control currents to and from the formation from the three current electrodes.

A machine-readable storage device 4 can include elements of any of machine-readable storage devices 1-3 and can include controlling current in the set of three current electrodes to include exciting the three current electrodes in the set of three current electrodes simultaneously with multiple frequencies.

A machine-readable storage device 5 can include elements of any of machine-readable storage devices 1-4 and can include interrogating the optical fiber to include interrogating the portion of the optical fiber with the portion of the optical fiber coated with an electrostrictive material over a length of the optical fiber between the injection and return current electrodes of the set of three current electrodes.

A machine-readable storage device 6 can include elements of any of machine-readable storage devices 1-5 and can include interrogating the optical fiber to include interrogating the portion of the optical fiber with the portion of the optical fiber coupled to an electro-optic transducer disposed along the pipe, the electro-optic transducer coupled to the two monitor electrodes.

A machine-readable storage device 7 can include elements of machine-readable storage device 6 and elements of any of machine-readable storage devices 1-5 and can include controlling the current and interrogating the optical fiber over time to include: setting a main current in the formation from one of the three current electrodes; adjusting a bucking current in the formation from the one of the other two current electrodes in the set of three current electrodes such that a voltage difference between the two monitor electrodes coupled to the electro-optic transducer is zero at a given baseline time where the waterflood is far away from the borehole; and measuring the voltage difference between the two monitor electrodes coupled to the electro-optic transducer as the waterflood approaches the wellbore.

A machine-readable storage device 8 can include elements of machine-readable storage device 6 and elements of any of machine-readable storage devices 1-5 and 7 and can include setting a main current in the formation from one of the three current electrodes; adjusting a bucking current in the formation from the one of the other two current electrodes in the set of three current electrodes such that a voltage difference between the two monitor electrodes coupled to the electro-optic transducer is zero; and measuring the adjusted bucking current as the waterflood approaches the wellbore.

A machine-readable storage device 9 can include elements of machine-readable storage device 6 and elements of any of machine-readable storage devices 1-5, 7, and 8 and can include controlling current in one or more additional sets of three current electrodes disposed along a longitudinal axis of the pipe using a first, a second, and a third power line from the surface, each additional set of three current electrodes associated with an additional set of two monitor electrodes, the two monitor electrodes of each additional set of two monitor electrodes being two current electrodes of the associated set of three current electrodes or two electrodes different from the associated additional set of three current electrodes, the two monitor electrodes of each additional set of two monitor electrodes tied to an individual electro-optic transducer of a set of electro-optic transducers coupled to the optical fiber, each set of three current electrodes sharing one of its three current electrodes with another set of three current electrodes, a first current electrode of the three current electrodes of each set of three current electrodes coupled to the first power line providing a main current from the respective set to the formation, a second current electrode of the three current electrodes of each set of three current electrodes coupled to the second power line providing a bucking current from the respective set of three current electrodes to the formation, a third current electrode of the three current electrodes of each set of three current electrodes coupled to the third power line providing a return; and adjusting the current in the second power line to make simultaneous measurements using the set of three current electrodes and the additional sets of three current electrodes.

A machine-readable storage device 10 can include elements of machine-readable storage device 6 and elements of any of machine-readable storage devices 1-5, and 7-9 and can include controlling current in one or more additional sets of three current electrodes disposed along the pipe using a first, a second, and a third power line from the surface, each current electrode of the three current electrodes of each set coupled to a different one power line of the three power lines, each additional set of three current electrodes associated with an additional set of two monitor electrodes, the two monitor electrodes of each additional set of two monitor electrodes being two current electrodes of the associated set of three current electrodes or two electrodes different from the associated additional set of three current electrodes, the two monitor electrodes of each additional set of two monitor electrodes tied to an individual electro-optic transducer of a set of electro-optic transducers coupled to the optical fiber, each set of three current electrodes sharing two of its three current electrodes with another set of three current electrodes; operating the control of the current in a dual cycle scheme in which, in a first cycle, a main current is injected in the formation using the first power line and a bucking current is injected in the formation using the second power line, and, in a second cycle, a main current is injected in the formation using the first power line and a bucking current is injected in the formation using the third power line.

A machine-readable storage device 11 can include elements of any of machine-readable storage devices 1-10 and can include controlling the current to include: monitoring a signal level due to the waterflood to determine a point at which the signal level reaches saturation; and adjusting a bucking current from one of the three current electrodes such that a signal level due to the waterflood is reduced to a minimal level at the point at which the signal level reaches saturation.

A machine-readable storage device 12 can include elements of any of machine-readable storage devices 1-11 and can include monitoring progression of waterflood to the wellbore from a plurality of injector wells.

A machine-readable storage device 13 can include elements of any of machine-readable storage devices 1-14 and can include controlling current in the set of three current electrodes to include controlling current in a plurality of sets of three current electrodes with the current electrodes of the sets of three current electrodes disposed on the pipe at different azimuthal positions at substantially a same axial position along the longitudinal axis of the pipe to determine direction of the waterflood as the waterflood progresses.

A machine-readable storage device 14 can include elements of any of machine-readable storage devices 1-13 and can include operating a processor to determine waterflood distance and resistivity that minimizes misfit between bucked measurements and synthetic data, the synthetic data generated using a model that includes simulation of operation of the set of three current electrodes in the formation, the bucked measurements generated using the controlling of the current of the set of three current electrodes and interrogating the optical fiber over time.

A machine-readable storage device 15 can include elements of machine-readable storage device 14 and elements of any of machine-readable storage device 1-13 and can include the bucked measurements to include voltage measurements using a baseline bucking scheme or current measurements using a continuous bucking scheme.

A system 1 can comprise: a set of electrodes disposed on a pipe in a wellbore, the set having three current electrodes operable to inject current into a formation around the pipe in the wellbore with one of the three current electrodes of the set operatively arranged as a return, the set arranged to include two monitor electrodes, the two monitor electrodes being two current electrodes of the three current electrodes or two electrodes different from the three current electrodes; an optical fiber extending along the longitudinal axis of the pipe with a portion of the optical fiber associated with the set of electrodes in a sensing operation of the set of electrodes; and a set of processors arranged to control the injection of current by the three current electrodes, to control interrogation of the optical fiber over time, and to determine progression of waterflood with respect to the wellbore.

A system 2 can include elements of system 1 and can include three separate power lines coupled to the three current electrodes from the surface, each power line coupled to a respective one of the three current electrodes.

A system 3 can include elements of systems 1 and 2 and can include a single power line and a return coupled to downhole electronics from the surface, the downhole electronics operable to control currents to and from the formation from the three current electrodes.

A system 4 can include elements of any of systems 1-3 and can include the set of processors arranged to excite the three current electrodes in the set simultaneously with multiple frequencies.

A system 5 can include elements of any of systems 1-4 and can include the portion of the optical fiber being coated with an electrostrictive material over a length of the optical fiber between injection and return current electrodes of the set.

A system 6 can include elements of any of systems 1-5 and can include the portion of the optical fiber being coupled to an electro-optic transducer disposed along the pipe, the electro-optic transducer coupled to the two monitor electrodes.

A system 7 can include elements of system 6 and elements of any of systems 1-5 and can include the control of the injection of current and interrogation of the optical fiber over time to include control of operations to: set a main current in the formation from one of the three current electrodes; adjust a bucking current in the formation from the one of the other two current electrodes in the set of three current electrodes such that a voltage difference between the two monitor electrodes coupled to the electro-optic transducer is zero at a given baseline time where the waterflood is far away from the borehole; and measure the voltage difference between the two monitor electrodes coupled to the electro-optic transducer as the waterflood approaches the wellbore.

A system 8 can include elements of system 6 and elements of any of systems 1-5 and 7 and can include the control of the injection of current and interrogation of the optical fiber over time to include control of operations to: set a main current in the formation from one of the three current electrodes; adjust a bucking current in the formation from one of the other two current electrodes of the set such that a voltage difference between the two monitor electrodes coupled to the electro-optic transducer is zero; and measure the adjusted bucking current as the waterflood approaches the wellbore.

A system 9 can include elements of system 6 and elements of any of systems 1-5, 7, and 8 and can include: a first, a second, and a third power line; one or more additional sets of electrodes disposed on the pipe in the wellbore, each additional set having three current electrodes operable to inject current into the formation around the pipe with one of the three current electrodes of each additional set operatively arranged as a return, each additional set arranged to include two monitor electrodes, the two monitor electrodes being two current electrodes of the three current electrodes or two electrodes different from the three current electrodes, each set sharing one of its three current electrodes with another set, a first current electrode of the three electrodes of each set coupled to the first power line to operatively provide a main current from the respective set to the formation, a second current electrode of the three current electrodes of each set coupled to the second power line to operatively provide a bucking current from the respective set to the formation, a third current electrode of the three current electrodes of each set coupled to the third power line to operatively provide a return; one or more additional electro-optic transducers in a one-to-one correspondence with the one or more additional sets, each additional electro-optic transducer coupled to the optical fiber and each electro-optic transducer coupled to the two monitor electrodes of the additional set to which it corresponds; and the set of processors arranged to adjust current in the second power line to make simultaneous measurements using the set of electrodes, the additional sets of electrodes, and the corresponding electro-optic transducers.

A system 10 can include elements of system 6 and elements of any of systems 1-5, and 7-9 and can include: a first, a second, and a third power line; one or more additional sets of current electrodes disposed on the pipe in the wellbore, each additional set having three current electrodes operable to inject current into the formation around the pipe with one of the three current electrodes of each additional set operatively arranged as a return, each additional set arranged to include two monitor electrodes, the two monitor electrodes being two current electrodes of the three current electrodes or two electrodes different from the three current electrodes, each set sharing two of its three current electrodes with another set, a first current electrode of the three electrodes of each set coupled to the first power line, a second current electrode of the three current electrodes of each set coupled to the second power line, a third current electrode of the three current electrodes of each set coupled to the third power line; one or more additional electro-optic transducers in a one-to-one correspondence with the one or more additional sets of electrodes, each additional electro-optic transducer coupled to the optical fiber and each electro-optic transducer coupled to the two monitor electrodes of the additional set to which it corresponds; and the set of processors arranged to control current to and from the three current electrodes of the set and to and from the three current electrodes of the one or more additional sets of electrodes in a dual cycle scheme in which, in a first cycle, a main current is operatively injected in the formation from the first power line and a bucking current is operatively injected in the formation from the second power line, and, in a second cycle, a main current is operatively injected in the formation from the first power line and a bucking current is operatively injected in the formation from the third power line.

A system 11 can include elements of any of systems 1-10 and can include the set of processors arranged to control operations to: monitor a signal level due to the waterflood to determine a point at which the signal level reaches saturation; adjust a bucking current from one of the two current electrodes of the three current electrode electrodes such that a signal level due to the waterflood is reduced to a minimal level at the point at which the signal level reaches saturation.

A system 12 can include elements of any of systems 1-11 and can include the set of processors arranged to control operations to monitor progression of waterflood to the wellbore from a plurality of injector wells.

A system 13 can include elements of any of systems 1-14 and can include a plurality of sets of three current electrodes with the electrodes of the sets of three current electrodes disposed on the pipe at different azimuthal positions at substantially a same axial position along the longitudinal axis of the pipe to determine direction of the waterflood as the waterflood progresses.

A system 14 can include elements of any of systems 1-13 and can include the set of processors arranged to determine waterflood distance and resistivity that minimizes misfit between bucked measurements and synthetic data, the synthetic data generated by use of a model that includes simulation of operation of the set of three current electrodes in the formation, the bucked measurements generated by use of control of current in the set of three current electrodes and interrogation of the optical fiber over time.

A system 15 can include elements of system 14 and elements of any of systems 1-13 and can include the bucked measurements to include voltage measurements from a baseline bucking scheme or current measurements from a continuous bucking scheme.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:

controlling current in a set of three current electrodes to inject current into a formation around a pipe in a wellbore, the three current electrodes disposed on the pipe in the wellbore such that two current electrodes of the three current electrodes inject current and the third current electrode is operatively arranged as a current return, the three current electrodes associated with a set of two monitor electrodes, the two monitor electrodes being two current electrodes of the set of three current electrodes or two electrodes different from the set of three current electrodes, interrogating an optical fiber, the optical fiber extending along the longitudinal axis of the pipe with a portion of the optical fiber associated with the set of three current electrodes in a sensing operation using the set of three current electrodes;

determining progression of waterflood with respect to the wellbore from controlling the current and interrogating the optical fiber over time; and operating a processor to determine waterflood distance and resistivity that minimizes misfit between bucked measurements and synthetic data, the synthetic data generated using a model that includes simulation of operation of the set of three current electrodes in the formation, the bucked measurements generated using the controlling of the current of the set of three current electrodes and interrogating the optical fiber over time.

2. The method of claim 1, wherein controlling current in the set of three current electrodes includes:

using three separate power lines coupled to the set of three current electrodes from a surface, each power line coupled to a respective one of the three current electrodes;

using a single power line and a return coupled to downhole electronics from the surface, the downhole electronics operable to control currents to and from the formation from the three current electrodes; or exciting the three current electrodes in the set of three current electrodes simultaneously with multiple frequencies.

3. The method of claim 1, wherein interrogating the optical fiber includes:

interrogating the portion of the optical fiber with the portion of the optical fiber coated with an electrostrictive material over a length of the optical fiber between the injection and return current electrodes of the set of three current electrodes.

4. The method of claim 1, wherein interrogating the optical fiber includes interrogating the portion of the optical fiber with the portion of the optical fiber coupled to an electro-optic transducer disposed along the pipe, the electro-optic transducer coupled to the two monitor electrodes.

5. The method of claim 4, wherein controlling the current and interrogating the optical fiber over time includes:

setting a main current in the formation from one of the three current electrodes;

adjusting a bucking current in the formation from a one of the other two current electrodes in the set of three current electrodes such that a voltage difference between the two monitor electrodes coupled to the electro-optic transducer is zero at a given baseline time where the waterflood is far away from the wellbore; and measuring the voltage difference between the two monitor electrodes coupled to the electro-optic transducer as the waterflood approaches the wellbore.

6. The method of claim 4, wherein controlling the current and interrogating the optical fiber over time includes:

setting a main current in the formation from one of the three current electrodes;

adjusting a bucking current in the formation from a one of the other two current electrodes in the set of three current electrodes such that a voltage difference between the two monitor electrodes coupled to the electro-optic transducer is zero; and measuring the adjusted bucking current as the waterflood approaches the wellbore.

7. The method of claim 1, wherein controlling the current includes:

monitoring a signal level due to the waterflood to determine a point at which the signal level reaches saturation;

adjusting a bucking current from one of the three current electrodes such that a signal level due to the waterflood is reduced to a minimal level at the point at which the signal level reaches saturation; or controlling current in a plurality of sets of three current electrodes, including the set of three current electrodes, with the current electrodes of the sets of three current electrodes disposed on the pipe at different azimuthal positions at substantially a same axial position along a longitudinal axis of the pipe to determine direction of the waterflood as the waterflood progresses.

8. The method of claim 1, wherein the method includes monitoring progression of waterflood to the wellbore from a plurality of injector wells.

9. The method of claim 1, wherein the bucked measurements include voltage measurements using a baseline bucking scheme or current measurements using a continuous bucking scheme.

10. A non-transitory machine-readable storage device having instructions stored thereon, which, when executed by one or more processors of a machine, cause the machine to perform operations, the operations comprising:

controlling current in a set of three current electrodes forming a bi-pole to inject current into a formation around a pipe in a wellbore, the three current electrodes disposed on the pipe in the wellbore such that two current electrodes of the three current electrodes inject current and the third current electrode is operatively arranged as a current return, the three current electrodes associated with a set of two monitor electrodes, the two monitor electrodes being two current electrodes of the set of three current electrodes or two electrodes different from the set of three current electrodes, interrogating an optical fiber, the optical fiber extending along the longitudinal axis of the pipe with a portion of the optical fiber associated with the set of three current electrodes in a sensing operation using the set of three current electrodes;

determining progression of waterflood with respect to the wellbore from controlling the current and interrogating the optical fiber over time; and operating a processor to determine waterflood distance and resistivity that minimizes misfit between bucked measurements and synthetic data, the synthetic data generated using a model that includes simulation of operation of the set of three current electrodes in the formation, the bucked measurements generated using the controlling of the current of the set of three current electrodes and interrogating the optical fiber over time.

11. A system comprising:

a set of electrodes disposed on a pipe in a wellbore, the set having three current electrodes operable to inject current into a formation around the pipe in the wellbore with one of the three current electrodes of the set operatively arranged as a return, the set arranged to include two monitor electrodes, the two monitor electrodes being two current electrodes of the three current electrodes or two electrodes different from the three current electrodes;

an optical fiber extending along the longitudinal axis of the pipe with a portion of the optical fiber associated with the set of electrodes in a sensing operation of the set of electrodes;

a set of processors arranged to control the injection of current by the three current electrodes, to control interrogation of the optical fiber over time, and to determine progression of waterflood with respect to the wellbore; and the processors being further arranged to determine watt Mood distance and resistivity that minimizes misfit between bucked measurements and synthetic data, the synthetic data generated by use of aa model that includes simulation of operation of the set of three current electrodes in the formation, the bucked measurements generated by use of control of current in the set of three current electrodes and interrogation of the optical fiber over time.

12. The system of claim 11, wherein the system includes:

three separate power lines coupled to the three current electrodes from a surface; each power line coupled to a respective one of the three current electrodes; or a single power line and a return coupled to downhole electronics from the surface, the downhole electronics operable to control currents to and from the formation from the three current electrodes.

13. The system of claim 11, wherein the set of processors is arranged to excite the three current electrodes in the set simultaneously with multiple frequencies.

14. The system of claim 11, wherein:

the portion of the optical fiber is coated with an electrostrictive material over a length of the optical fiber between injection and return current electrodes of the set; or the portion of the optical fiber is coupled to an electro-optic transducer disposed along the pipe, the electro-optic transducer coupled to the two monitor electrodes.

15. The system of claim 14, wherein the control of the injection of current and interrogation of the optical fiber over time includes control of operations to:

set a main current in the formation from one of the three current electrodes;

adjust a bucking current in the formation from a one of the other two current electrodes in the set of three current electrodes such that a voltage difference between the two monitor electrodes coupled to the electro-optic transducer is zero at a given baseline time where the waterflood is far away from the wellbore; and measure the voltage difference between the two monitor electrodes coupled to the electro-optic transducer as the waterflood approaches the wellbore.

16. The system of claim 14, wherein the control of the injection of current and interrogation of the optical fiber over time includes control of operations to:

set a main current in the formation from one of the three current electrodes;

adjust a bucking current in the formation from one of the other two current electrodes of the set such that a voltage difference between the two monitor electrodes coupled to the electro-optic transducer is zero; and measure the adjusted bucking current as the waterflood approaches the wellbore.

17. The system of claim 11, wherein the set of processors is arranged to control operations to monitor progression of waterflood to the wellbore from a plurality of injector wells.

18. The system of claim 11, wherein the bucked measurements include voltage measurements from a baseline bucking scheme or current measurements from a continuous bucking scheme.

* * * * *